United States Patent
Ketema et al.

(10) Patent No.: US 11,989,387 B2
(45) Date of Patent: *May 21, 2024

(54) UPDATING AVAILABLE FEATURES BASED ON SERVER COMPATIBILITY

(71) Applicant: Tableau Software, LLC, Seattle, WA (US)

(72) Inventors: Maraki Aschalew Ketema, Seattle, WA (US); Douglas Alan Thomae, Seattle, WA (US); Linda Oliveira, Austin, TX (US); Miranda Rose Rensch, Seattle, WA (US); Yihai Zhu, Kirkland, WA (US); Ruben Baeza, Jr., Pflugerville, TX (US); Krishan Zachary Jain, Houston, TX (US); Faisal Ejaz, Austin, TX (US)

(73) Assignee: Tableau Software, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,539

(22) Filed: Jan. 23, 2023

(65) Prior Publication Data
US 2023/0161452 A1     May 25, 2023

Related U.S. Application Data

(63) Continuation of application No. 16/938,859, filed on Jul. 24, 2020, now Pat. No. 11,561,672.

(51) Int. Cl.
*G06F 3/04817*   (2022.01)
*G06F 3/0482*    (2013.01)
(Continued)

(52) U.S. Cl.
CPC ........ *G06F 3/04817* (2013.01); *G06F 3/0482* (2013.01); *G06F 9/451* (2018.02);
(Continued)

(58) Field of Classification Search
CPC .... G06F 3/04817; G06F 3/0482; G06F 9/451; G06F 16/254; G06F 16/26; G06F 16/287; H04L 67/01; H04L 67/125; H04L 67/566
See application file for complete search history.

(56) References Cited

U.S. PATENT DOCUMENTS

| 5,806,065 A | 9/1998 | Lomet |
|---|---|---|
| 7,383,541 B1 | 6/2008 | Banks |

(Continued)

OTHER PUBLICATIONS

Ketema, Office Action, U.S. Appl. No. 16/938,859, Oct. 4, 2021, 40 pgs.

(Continued)

*Primary Examiner* — Haoshian Shih
*Assistant Examiner* — Alvaro R Calderon, IV
(74) *Attorney, Agent, or Firm* — Morgan, Lewis & Bockius LLP

(57) ABSTRACT

A computing device displays a user interface for a data preparation application, including a flow pane that visually represents a data preparation flow and a plurality of icons in a flow element palette. Using a feature/version matrix, the device determines that (i) a first subset of parameterized operations represented by a first subset of icons is not supported by the data preparation server application according to a version number of the data preparation server application and (ii) a second subset of parameterized operations represented by a second subset of icons is supported by the data preparation server application. The device provides a first indication that the parameterized operations represented by the icons in the first subset are unavailable to be inserted into the data preparation flow and displays a visual indication that each of the icons in the second subset is available to be inserted.

20 Claims, 16 Drawing Sheets

(51) Int. Cl.
*G06F 9/451* (2018.01)
*G06F 16/25* (2019.01)
*G06F 16/26* (2019.01)
*G06F 16/28* (2019.01)
*H04L 67/01* (2022.01)

(52) U.S. Cl.
CPC ............ *G06F 16/254* (2019.01); *G06F 16/26* (2019.01); *G06F 16/287* (2019.01); *H04L 67/01* (2022.05)

(56) References Cited

U.S. PATENT DOCUMENTS

| | | |
|---|---|---|
| 9,413,807 B1 | 8/2016 | Sherman |
| 9,558,017 B2 | 1/2017 | Plate |
| 10,476,936 B1 | 11/2019 | Retnakumari |
| 10,719,332 B1 | 7/2020 | Dwivedi |
| 10,754,638 B1 | 8/2020 | Dwivedi |
| 10,775,976 B1 | 9/2020 | Abdul-Jawad |
| 11,113,353 B1 | 9/2021 | Echeverria |
| 2002/0112056 A1 | 8/2002 | Baldwin |
| 2003/0117434 A1 | 6/2003 | Hugh |
| 2006/0070007 A1 | 3/2006 | Cummins |
| 2006/0095447 A1 | 5/2006 | Dickinson |
| 2006/0168555 A1 | 7/2006 | Represas Ferrao |
| 2007/0038688 A1 | 2/2007 | Morrill |
| 2007/0136324 A1 | 6/2007 | Xu |
| 2007/0220507 A1 | 9/2007 | Back |
| 2007/0294684 A1 | 12/2007 | Kumashiro |
| 2008/0168135 A1 | 7/2008 | Redlich |
| 2008/0209392 A1 | 8/2008 | Able |
| 2009/0282369 A1 | 11/2009 | Jones |
| 2010/0023934 A1 | 1/2010 | Sheehan |
| 2011/0173168 A1 | 7/2011 | Jones |
| 2011/0179110 A1 | 7/2011 | Soloway |
| 2014/0075345 A1 | 3/2014 | Fippel |
| 2014/0157251 A1 | 6/2014 | Hocker |
| 2014/0244708 A1 | 8/2014 | Taine |
| 2014/0282469 A1 | 9/2014 | Johnson |
| 2015/0324437 A1 | 11/2015 | Jiang |
| 2016/0070451 A1 | 3/2016 | Kim |
| 2016/0378724 A1 | 12/2016 | Mullins |
| 2016/0378733 A1 | 12/2016 | Mullins |
| 2016/0378735 A1 | 12/2016 | Mullins |
| 2017/0069118 A1 | 3/2017 | Stewart |
| 2017/0103226 A1 | 4/2017 | Eberlein |
| 2017/0154088 A1 | 6/2017 | Sherman |
| 2017/0154089 A1 | 6/2017 | Sherman |
| 2017/0161511 A1 | 6/2017 | Eberlein |
| 2017/0322795 A1 | 11/2017 | DeMaris |
| 2017/0351511 A1 | 12/2017 | Bar-Or |
| 2018/0129374 A1 | 5/2018 | Kim |
| 2018/0129719 A1 | 5/2018 | Kim |
| 2018/0129720 A1 | 5/2018 | Kim |
| 2018/0232110 A1 | 8/2018 | Cheung |
| 2018/0232111 A1 | 8/2018 | Jones |
| 2018/0232426 A1 | 8/2018 | Gomez |
| 2018/0260106 A1 | 9/2018 | Leonard |
| 2019/0012356 A1 | 1/2019 | Colgrove |
| 2019/0114299 A1 | 4/2019 | Wesley |
| 2019/0340168 A1 | 11/2019 | Raman |
| 2020/0034342 A1 | 1/2020 | Mohapatra |
| 2020/0342039 A1 | 10/2020 | Bakir |
| 2020/0380033 A1 | 12/2020 | Vyas |
| 2021/0124610 A1 | 4/2021 | Gardner |

OTHER PUBLICATIONS

Ketema, Final Office Action, U.S. Appl. No. 16/938,859 Jun. 2, 2022, 36 pgs.

Ketema, Notice of Allowance, U.S. Appl. No. 16/938,859 Sep. 28, 2022, 9 pgs.

Tableu. "Version Compatibility with Tableau Prep." Jun. 19, 2019. https://web.archive.org/web/20190619135744/https://onlinehelp.tableau.conn/current/prep/en-us/prep_conductor_compatibility.htm (Year: 2019).

Tableau. "Tableau Prep Help." Jun. 17, 2019. https://web.archive.org/web/20190619140743/https://onlinehelp.tableau.conn/current/offline/en-us/tableau_prep.pdf (Year: 2019).

Feature/Version Matrix 290

| Feature ID | Feature Description | Minimum Version |
|---|---|---|
| 100 | Query Data Source | 2019.1 |
| 101 | Union | 2019.1 |
| 102 | Inner Join | 2019.1 |
| 103 | Left Outer Join | 2019.1 |
| 104 | Right Outer Join | 2019.1 |
| 105 | Filter by Field Value | 2019.1 |
| 106 | Drop Selected Fields | 2019.1 |
| 107 | Export | 2019.1 |
| 108 | Duplicate Fields | 2019.2 |
| 109 | Keep Only Selected Fields | 2019.2 |
| 110 | Script Steps | 2020.1 |
| ⋮ | ⋮ | ⋮ |

298-00 → 100
298-02 → 102
298-08 → 108
298-09 → 109
298-10 → 110

292 → Feature ID
294 → Feature Description
296 → Minimum Version

UPDATING AVAILABLE FEATURES BASED ON SERVER COMPATIBILITY

RELATED APPLICATIONS

This application is a continuation of U.S. patent application Ser. No. 16/938,859, filed Jul. 24, 2020, entitled "Compatibility-Based Feature Management for Data Prep Applications," which is hereby incorporated by reference herein in its entirety.

This application is related to U.S. patent application Ser. No. 15/345,391, filed Nov. 7, 2016, entitled "User Interface to Prepare and Curate Data for Subsequent Analysis" and U.S. patent application Ser. No. 15/705,174, now U.S. Pat. No. 10,528,587, filed Sep. 14, 2017, entitled "User Interface for Graphically Refactoring Data Flows," each of which is hereby incorporated by reference in its entirety. This application is also related to U.S. patent application Ser. No. 16/167,313, now U.S. Pat. No. 10,691,304, filed Oct. 22, 2018, entitled "Data Preparation User Interface with Conglomerate Heterogeneous Process Flow Elements," U.S. patent application Ser. No. 16/228,680, now U.S. Pat. No. 11,250,032, filed Dec. 20, 2018, entitled "Data Preparation User Interface with Conditional Remapping of Data Values," and U.S. patent application Ser. No. 16/221,413, now U.S. Pat. No. 10,996,835, filed Dec. 14, 2018, entitled "Data Preparation User Interface with Coordinated Pivots," each of which is hereby incorporated by reference in its entirety.

TECHNICAL FIELD

The disclosed implementations relate generally to data visualization and more specifically to systems, methods, and user interfaces to prepare and curate data to be published as data flows on a server system.

BACKGROUND

Data visualization applications enable a user to understand a data set visually, including distribution, trends, outliers, and other factors that are important to making business decisions. Some data sets are very large or complex, and include many data fields. Some data elements must be computed based on data from the selected data set. Various tools can be used to help understand and analyze the data, including dashboards that have multiple data visualizations.

In many cases, raw data must be modified or massaged in various ways in order to correct errors in the data and/or reformat the data so that it is more suitable for data analysis. In some cases, a user builds a flow using a tool such as Tableau Prep Builder, and executing the flow builds a modified data set. Each flow can use a variety of features (e.g., functions and operations). After building a flow, the user may publish the flow to a server, which can run the flow periodically to update the output. The periodic running is important in order to rebuild the data set based on updated raw data. (Most data sources continuously change based on user activity, such as a table of sales that updates every time a customer makes an online purchase.)

Having a flow that is created locally on a client device but runs on a separate server requires coordination between the client device and the server. For example, functions and operations included in the flow must be available at the server. In some cases, upgrades to the data prep application create new features that can be included in a flow. As long as the software on the client device and the software on the server are upgraded at the same time, the upgrade process works fine: any features that a user places into a flow are available at the server. Upgrading the server first is generally okay as well, as long as the server does not deprecate any features or alter the functionality of any existing features. On the other hand, if the client device is upgraded (without upgrading the server) and a user takes advantage of some new features, there is a problem when the flow is published to the server. The server may crash when it attempts to execute the unknown functions from the flow, may produce invalid data, or may not execute at all.

SUMMARY

There is a need for improved systems and methods to address incompatibilities between a client deice and a corresponding server. In some cases, the improved methods prevent a user from accessing features within a data prep application when the user is connected to a server running an incompatible version of the application.

The present disclosure describes processes and user interfaces that are used by data preparation ("data prep") applications. These data prep applications allow a user to select fields in a data source for grouping. The data prep applications perform calculations within each group independently, and provide the user with a view into the statistical distributions. The user can interact with the calculations and identify statistical information on the fly. The data prep applications also include visual indicators that provide the user with visual hints on what the results are, and what outliers there might be, before the user commits to a calculation.

The data prep applications connect with server systems in order to access data sources and publish the user's flows to a server. The server executes the published flows according to a designated schedule. Some of the features that are made available to the user in the data prep applications running on the user's device are only compatible with the latest and most up-to-date versions of the data prep applications executing at the server system. Depending on which server system the client device connects to for publishing, certain features that are available in the data prep application are not available at the server. The present disclosure describes how the data prep application is able to recognize the version running at the server to provide a better user experience by notifying the user when particular functions are not available because of the server version. The client application does not crash, the server application does not crash, the server application does not provide invalid data, and the user is alerted to which functions and operators are available from the connected server.

In accordance with some implementations, a method is performed at a computing device having a display, one or more processors, and memory storing one or more programs configured for execution by the one or more processors. The method builds data preparation flows. The device displays a user interface for a data preparation application, including a plurality of icons in a flow element palette, each icon representing a respective parameterized operation that can be inserted into data preparation flows in a displayed flow pane of the user interface. A user places a plurality of the icons into the flow pane, visually defining flow elements for a flow that extracts data from one or more selected data sources, transforms the extracted data, and exports the transformed data as a new data source. The device retrieves a first version number of a corresponding data prep server application running on a first connected server. Using a feature/version matrix, the device determines that a first subset of the flow elements is not supported by the data prep server application according to the first version number. In accordance with the determination that the flow elements in the first subset are not supported by the data prep server application running on the first connected server, the device provides an indication to a user, that the flow elements in the first subset are unavailable.

In some implementations, the device retrieves a second version number of a corresponding data prep server application running on a second connected server. The second version number is distinct from the first version number. Using the feature/version matrix, the device determines that the first subset of the flow elements is supported by the data prep server application according to the second version number. In accordance with the determination that the flow elements in the first subset are supported by the data prep server application running on the second connected server, the device provides an indication to the user that the flow elements in the first subset are available. Subsequently, the user chooses to publish the flow to the second connected server. In accordance with the user's decision, the device publishes the flow to the second connected server, including a schedule for executing the flow periodically at the second connected server.

In some instances the first connected server is subsequently upgraded, thereby supporting more of the operations corresponding to the icons on the flow element palette. At a time subsequent to retrieving the first version number from the first connected server, the device retrieves an updated first version number of the corresponding data prep server application running on the first connected server. The updated first version number is distinct from the first version number. Using the feature/version matrix, the device determines that the first subset of the flow elements is supported by the data prep server application according to the updated first version number. In accordance with the determination that the flow elements in the first subset are supported by the data prep server application running on the first connected server, the device provides an indication to the user, that the flow elements in the first subset are available. The user then provides input to specify publication of the flow. In accordance with additional received user input, the device publishes the flow to the first connected server, including a schedule for executing the flow periodically at the first connected server.

In some instances, a user is able to restructure the flow in a way that does not use the flow elements that are unsupported by the server. The user modifies the flow, replacing the flow elements in the first subset with alternative flow elements corresponding to other icons in the flow palette. Using the feature/version matrix, the device determines that all of the flow elements in the modified flow are supported by the data prep server application according to the first version number. In accordance with the determination that all of the flow elements in the modified flow are supported by the data prep server application running on the first connected server, the device provides an indication to the user that all of the flow elements in the modified flow are available. The user then provides input to specify publication of the flow. In accordance with the user input, the device publishes the modified flow to the first connected server, including a schedule for executing the modified flow periodically at the first connected server.

In some implementations, the indication that certain flow elements are not available is a warning notification to notify the user the flow elements in the first subset are unavailable.

In some implementations, the warning notification comprises a respective visual notation in each of the flow elements, in the first subset, displayed in the flow pane.

In some implementations, the indication that certain flow elements are not available includes changing the color of each flow element in the first subset, displayed in the flow pane.

In some implementations, the data prep application is running on a version that is newer than the first version of the data prep server application running on the first connected server.

In some implementations, the indication that a flow element is unavailable is provided in response to user selection of a flow element (e.g., a flow element in the first subset).

In some implementations, after retrieving the first version number the device uses the feature/version matrix to determine that a second subset of the plurality of icons in the flow element palette is not supported in the first version. In response to this determination, the device disables selection of the second subset of the plurality of icons from the flow palette.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to build data flows with a variety of features that are available according to the software version running on the connected server system.

BRIEF DESCRIPTION OF THE DRAWINGS

For a better understanding of the aforementioned systems, methods, and graphical user interfaces, as well as additional systems, methods, and graphical user interfaces for data prep applications, reference should be made to the Description of Implementations below, in conjunction with the following drawings in which like reference numerals refer to corresponding parts throughout the figures.

FIG. 2C provides a skeletal data structure for a feature/version matrix, which identifies what version of the server software is required for each of the features that may be included in a data prep flow, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details

DESCRIPTION OF IMPLEMENTATIONS

Figure 1A:
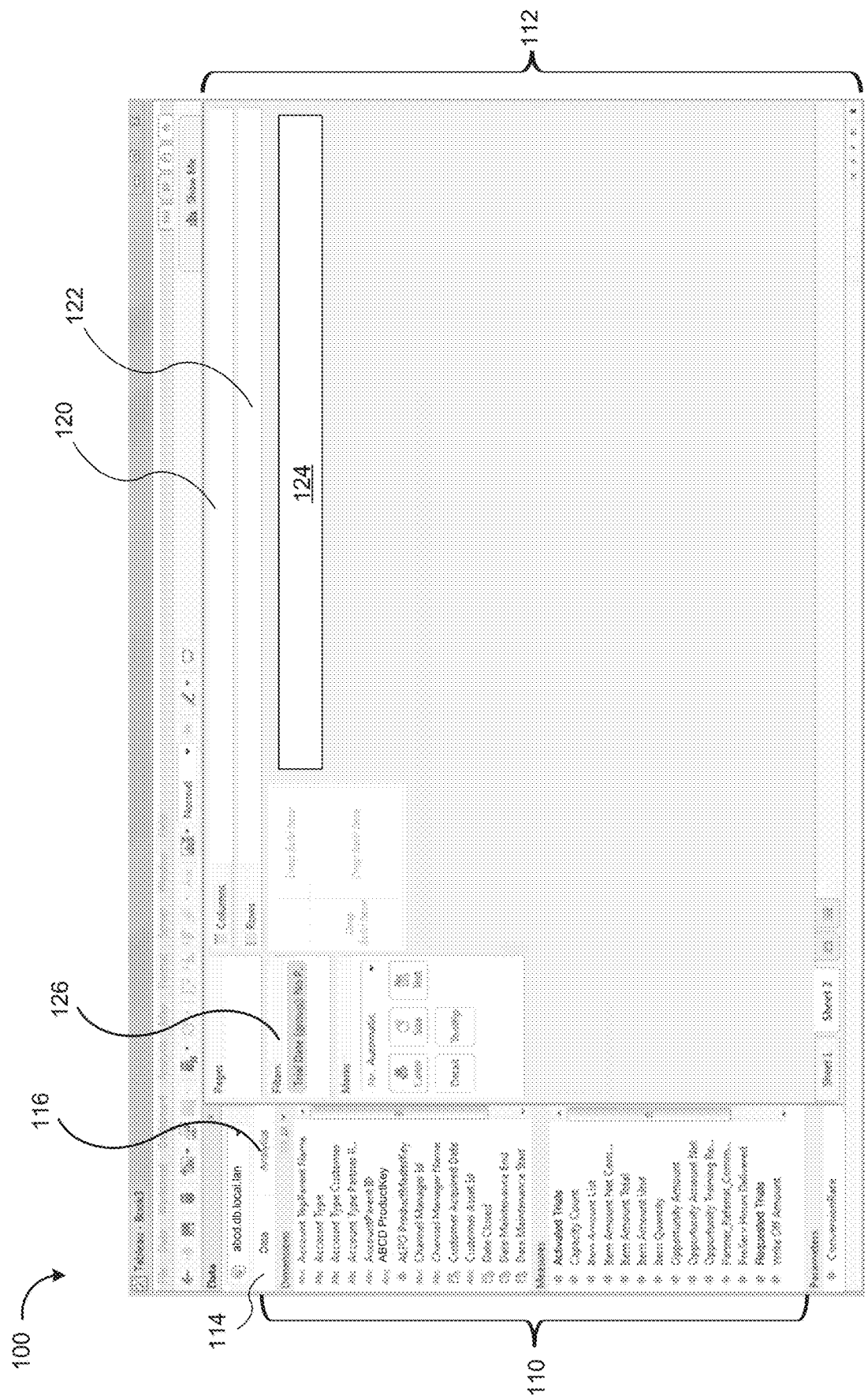
FIG. 1A illustrates a graphical user interface for data visualization according to some implementations.

FIG. 1A illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. Details on the use of natural language expressions to generate data visualizations are described in U.S. patent application Ser. No. 16/234,470, filed Dec. 27, 2018, entitled "Analyzing Underspecified Natural Language Utterances in a Data Visualization User Interface," and in U.S. patent application Ser. No. 16/601,437, filed Oct. 14, 2019, entitled "Incremental Updates to Natural Language Expressions in a Data Visualization User Interface," each of which is incorporated by reference herein in its entirety.

In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 1B:
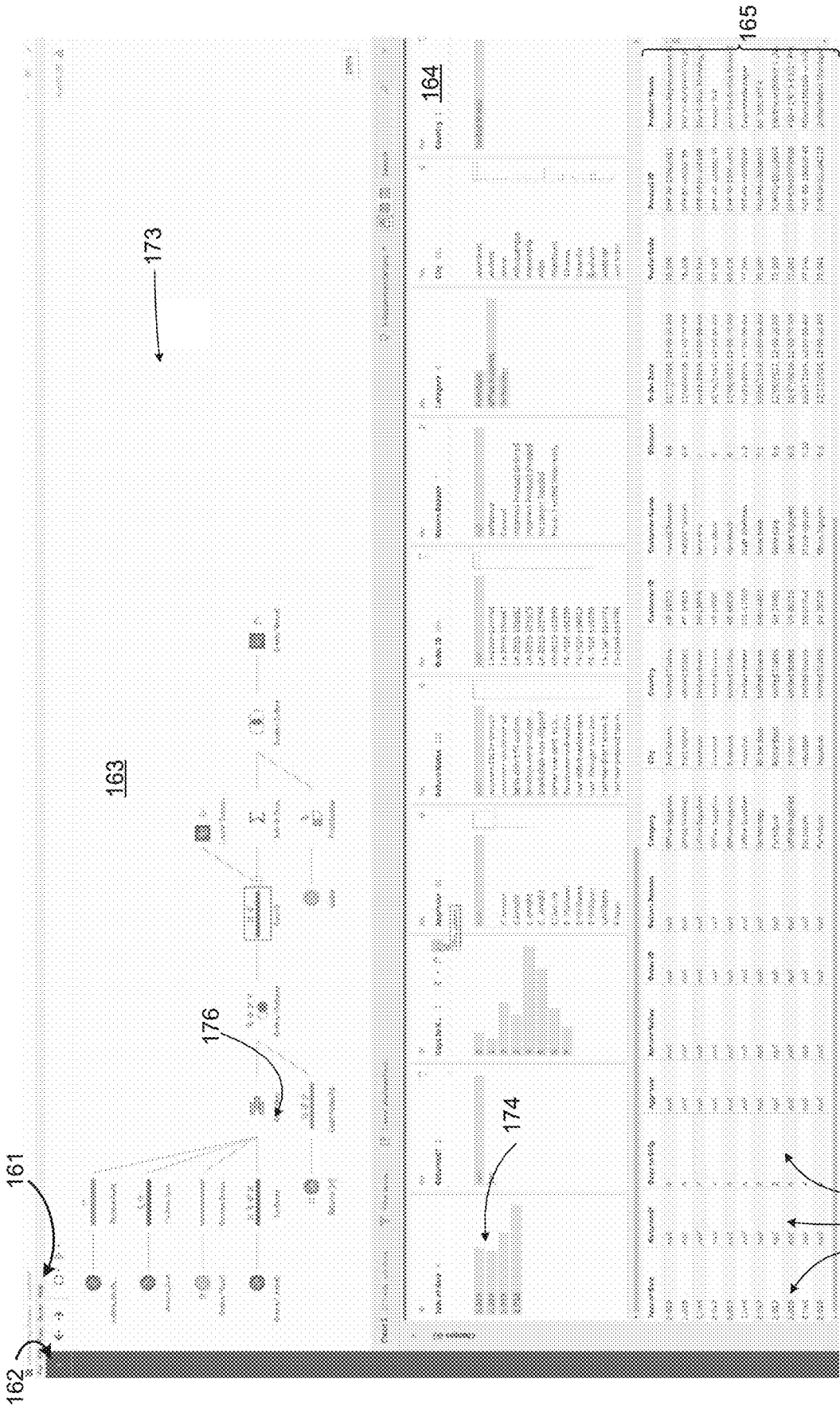
FIGS. 1B-1C illustrate user interfaces for a data prep application according to some implementations.

FIG. 1B illustrates a user interface for data preparation, showing the user interface elements in each of the panes. The menu bar 161 includes one or more menus, such as a File menu and an Edit menu. Although the edit menu is available, more changes to the flow are performed by interacting with the flow pane 163, the profile pane 164, or the data pane 165.

In some implementations, a left-hand pane (not shown) can be expanded by selecting an arrow 162. The left-hand pane, when expanded, includes a data source palette/selector, which includes affordances for locating and connecting to data. The set of connectors includes extract-only connectors, including cubes. Implementations can issue custom SQL expressions to any data source that supports it.

The left-hand pane also includes an operations palette, which displays operations that can be placed into the flow. This includes arbitrary joins (of arbitrary type and with various predicates), union, pivot, rename and restrict column, projection of scalar calculations, filter, aggregation, data type conversion, data parse, coalesce, merge, split, aggregation, value replacement, and sampling. Some implementations also support operators to create sets (e.g., partition the data values for a data field into sets), binning (e.g., grouping numeric data values for a data field into a set of ranges), and table calculations (e.g., calculate data values (e.g., percent of total) for each row that depend not only on the data values in the row, but also other data values in the table).

The left-hand pane also includes a palette of other flows that can be incorporated in whole or in part into the current flow. This enables a user to reuse components of a flow to create new flows. For example, if a portion of a flow has been created that scrubs a certain type of input using a combination of 10 steps, that 10 step flow portion can be saved and reused, either in the same flow or in completely separate flows.

The flow pane 163 displays a visual representation (e.g., node/link flow diagram) 173 for the current flow. The Flow Pane 163 provides an overview of the flow, which serves to document the process. In many existing products, a flow is overly complex, which hinders comprehension. Disclosed implementations facilitate understanding by coalescing nodes, keeping the overall flow simpler and more concise. As noted above, as the number of nodes increases, implementations typically add scroll boxes. The need for scroll bars is reduced by coalescing multiple related nodes into super nodes, which are also called container nodes. This enables a user to see the entire flow more conceptually, and allows a user to dig into the details only when necessary. In some implementations, when a "super node" is expanded, the flow pane 163 shows just the nodes within the super node, and the flow pane 163 has a heading that identifies what portion of the flow is being display. Implementations typically enable multiple hierarchical levels. A complex flow is likely to include several levels of node nesting.

As described above, the profile pane 164 includes schema information about the data at the currently selected node (or nodes) in the flow pane 163. As illustrated here, the schema information provides statistical information about the data, such as a histogram 174 of the data distribution for each of the fields. A user can interact directly with the profile pane to modify the flow 173 (e.g., by selecting a data field for filtering the rows of data based on values of that data field). The profile pane 164 also provides users with relevant data about the currently selected node (or nodes) and visualizations that guide a user's work. For example, histograms 174 show the distributions of the domains of each column. Some implementations use brushing to show how these domains interact with each other.

An example here illustrates how the process is different from typical implementations by enabling a user to directly manipulate the data in a flow. Consider two alternative ways of filtering out specific rows of data. In this case, a user wants to exclude California from consideration. Using a typical tool, a user selects a "filter" node, places the filter into the flow at a certain location, then brings up a dialog box to enter the calculation formula, such as "state_name < > "CA". In disclosed implementations here, the user can see the data value in the profile pane 164 (e.g., the column State Code 176 shows the field value "California" and a histogram bar for California indicates how many rows have that field value) and in the data pane 165 (e.g., individual rows with "California" as the value for State Code). In some implementations, the user can right click on "California" in the list of state names in the Profile Pane 164 (or in the Data Pane 165), and choose "Exclude" from a drop down. The user interacts with the data itself, not a flow element that interacts with the data. Implementations provide similar functionality for calculations, joins, unions, aggregates, and so on. Another benefit of the approach is that the results are immediate. When "California" is filtered out, the filter applies immediately. If the operation takes some time to complete, the operation is performed asynchronously, and the user is able to continue with work while the job runs in the background.

The data pane 165 displays the rows of data corresponding to the selected node or nodes in the flow pane 163. Each of the columns 175 corresponds to one of the data fields. A user can interact directly with the data in the data pane to modify the flow 173 in the flow pane 163. A user can also interact directly with the data pane to modify individual field values. In some implementations, when a user makes a change to one field value, the user interface applies the same change to all other values in the same column whose values (or pattern) match the value that the user just changed. For example, if a user changed "WA" to "Washington" for one field value in the State Code data column, some implementations update all other "WA" values to "Washington" in the same column. Some implementations go further to update the column to replace any state abbreviations in the column to be full state names (e.g., replacing "OR" with "Oregon"). In some implementations, the user is prompted to confirm before applying a global change to an entire column. In some implementations, a change to one value in one column can be applied (automatically or pseudo-automatically) to other columns as well. For example, a data source may include both a state for residence and a state for billing. A change to formatting for states can then be applied to both.

The sampling of data in the data pane 165 is selected to provide valuable information to the user. For example, some implementations select rows that display the full range of values for a data field (including outliers). As another example, when a user has selected nodes that have two or more tables of data, some implementations select rows to assist in joining the two tables. The rows displayed in the data pane 165 are selected to display both rows that match between the two tables as well as rows that do not match. This can be helpful in determining which fields to use for joining and/or to determine what type of join to use (e.g., inner, left outer, right outer, or full outer).

Figure 1C:
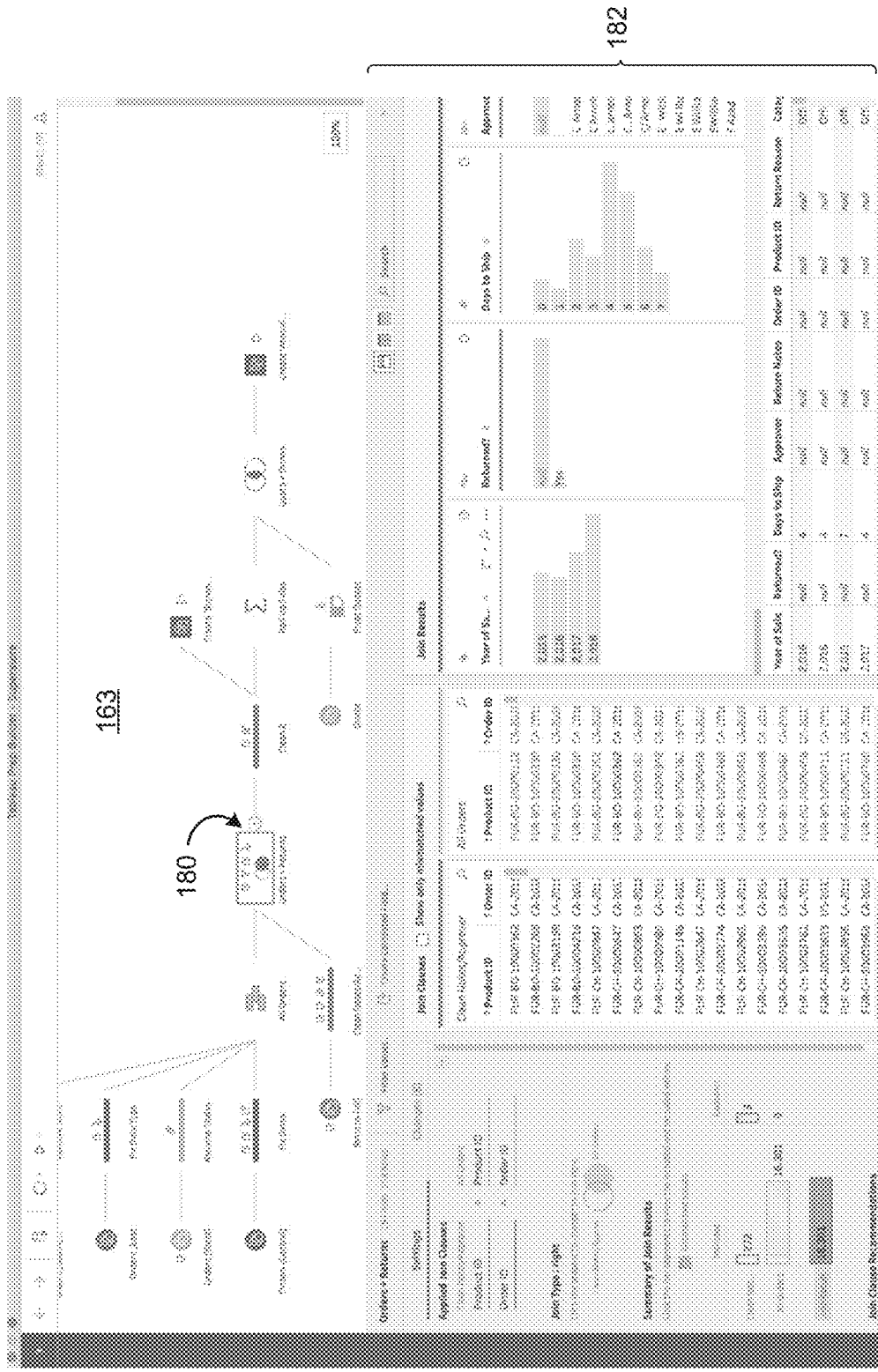

FIG. 1C illustrates a graphical user interface in accordance with some implementations. In some implementations, a user selects a particular node (e.g., the node 180) from the flow pane 163. In this example, the node 180 is a join node, which joins data from the "Clean Notes/Approver" node and the "All Orders" node. In some implementations, in response to the selection of a particular node, at least a portion of the interface is replaced with a context-specific function pane 182 corresponding to the selected node. For example, because the node 180 represents a join, the function pane 182 provides information specific to a join (e.g., with information about the data sources that are joined). In some implementations, the function pane 182 provides more information about the selected node. For example, the join pane 182 provides visual indicators of the join clauses as well as the join results. Selection of different types of nodes results in displaying a different function pane corresponding to the selected node (e.g., a context-specific function pane for a union or a pivot).

Figure 2A:
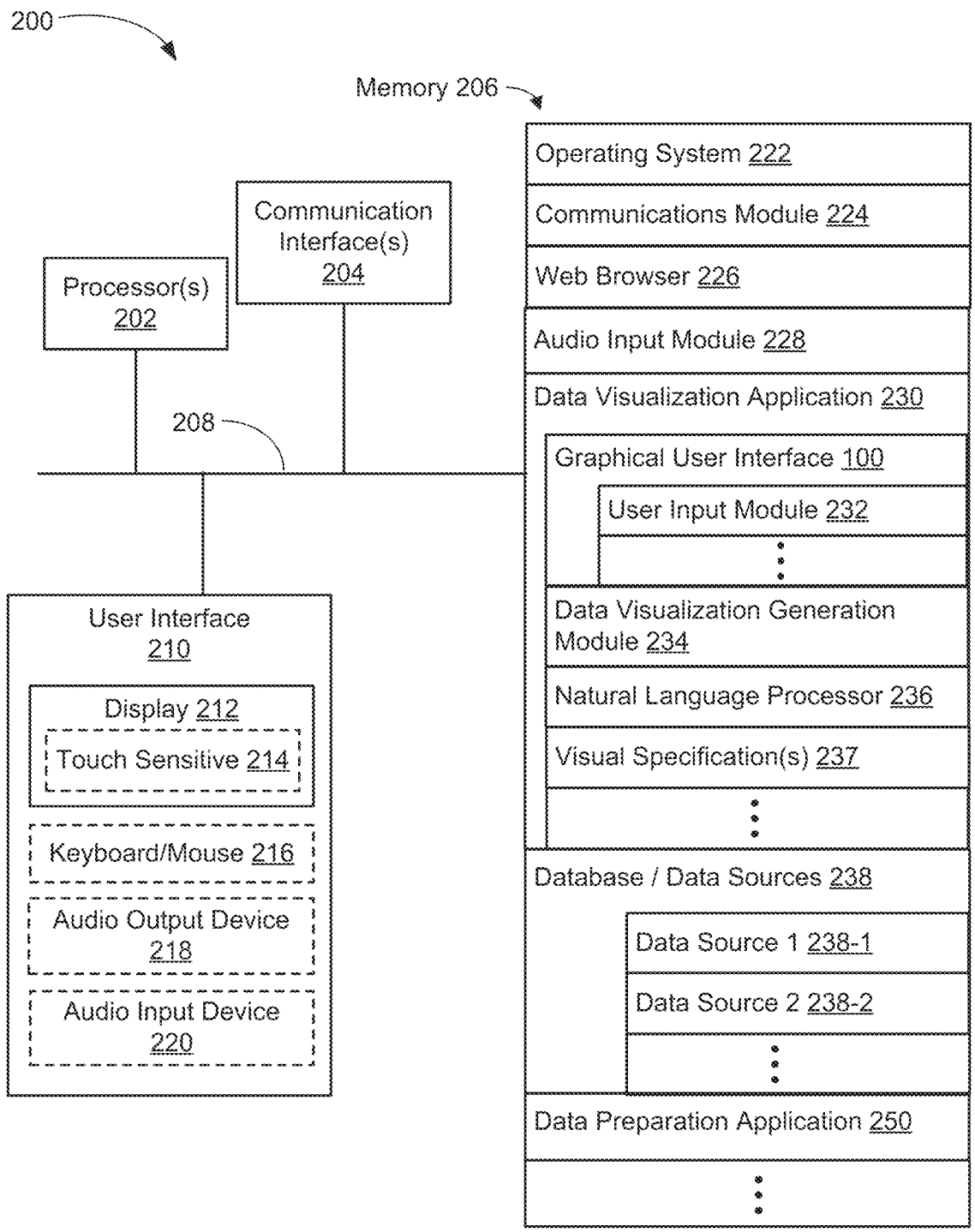
FIGS. 2A and 2B are block diagrams of a computing device according to some implementations.

FIG. 2A is a block diagram illustrating a computing device 200 that can display the graphical user interface 100 in accordance with some implementations. The computing device can also be used by a data preparation ("data prep") application 250. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230, the natural language processing module 236, or the data prep application 250);
- a data visualization application 230, which generates data visualizations and related features. In some implementations, the data visualization application 230 includes:
  - a graphical user interface 100 for a user to construct visual graphics. In some implementations, the graphical user interface includes a user input module 232 for receiving user input through the natural language box 124. For example, a user inputs a natural language command or expression into the natural language box 124 identifying one or more data sources 238 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
  - a data visualization generation module 234, which automatically generates and displays a corresponding visual graphic (also referred to as a "data visualization" or a "data viz") using the user input (e.g., the natural language input);
  - a natural language processing module 236, which receives and parses the natural language input provided by the user. In some instances, the natural language processing module 236 identifies analytical expressions, such as aggregation expressions, group expressions, filter expressions, limit expressions, sort expressions, and table calculation expressions, as described in U.S. patent application Ser. No. 16/234,470, filed Dec. 27, 2018, entitled "Analyzing Underspecified Natural Language Utterances in a Data Visualization User Interface," which is incorporated by reference herein in its entirety;
  - visual specifications 237, which are used to define characteristics of a desired data visualization. In some implementations, the information the user provides (e.g., user input) is stored as a visual specification. In some implementations, the visual specifications 237 include previous natural language commands received from a user or properties specified by the user through natural language commands. In some instances, a visual specification 237 includes two or more aggregations based on different levels of detail. Further information about levels of detail are provided in U.S. patent application Ser. No. 14/801,750, filed Jul. 16, 2015, entitled "Systems and Methods for using Multiple Aggregation Levels in a Single Data Visualization," which is incorporated by reference herein in its entirety; and
- zero or more databases or data sources 238 (e.g., a first data source 238-1 and a second data source 238-2), which are used by the data visualization application 230. In some implementations, the data sources are stored as spreadsheet files, CSV files, XML files, or flat files, or stored in a relational database.

In some implementations, the computing device 200 includes a data prep application 250, which can be used to analyze and massage data for subsequent analysis (e.g., by a data visualization application 230).

Figure 2B:
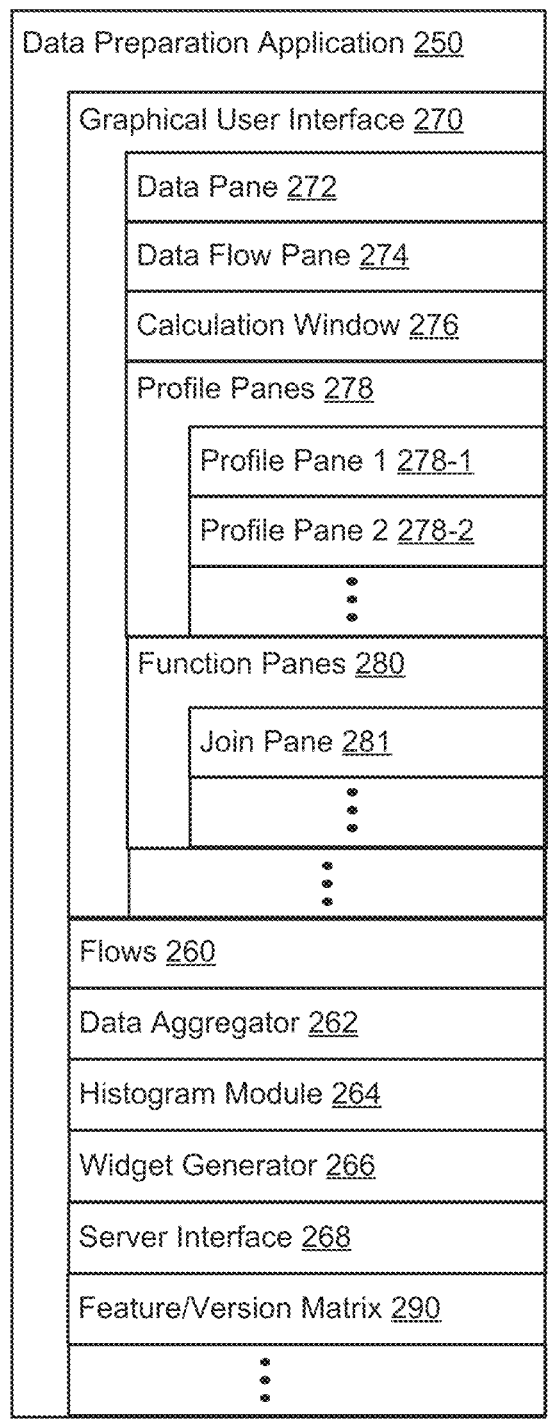

FIG. 2B is a block diagram illustrating a data prep application 250 in accordance with some implementations. In some implementations, the data prep application 250 includes:

- a graphical user interface 270 for preparing data. In some implementations, the graphical user interface 270 includes one or more panes ("windows"), such as:
  - a data pane 272, which displays rows and columns of data (e.g., as a grid) corresponding to selected nodes in the flow diagram, and enables users to modify the flow diagram by interacting with individual data values. Further details of the data pane 272 are described in U.S. patent application Ser. No. 15/345,391, filed Nov. 7, 2016, entitled "User Interface to Prepare and Curate Data for Subsequent Analysis" and described in U.S. patent application Ser. No. 15/701,381, filed Sep. 11, 2017, entitled "Optimizing Execution of Data Transformation Flows," each of which is incorporated by reference herein in its entirety;
  - a data flow pane 274, which displays a visual representation (e.g., node/link flow diagram). The visual representation identifies data sources, operations, and output data sets for a current flow, as described in U.S. patent application Ser. No. 15/345,391 and U.S. patent application Ser. No. 15/701,381. Selection of a node in the data flow pane determines a data set whose data rows are displayed in the data pane 272;
  - a calculation window 276, which displays data rows of data fields of the data source that have been aggregated during data preparation. In some implementations, the calculation window 276 also displays the distributions (e.g., statistical distributions) and visual indicators of the aggregated data fields. See the description of the Profile Pane in U.S. patent application Ser. No. 15/345,391 and U.S. patent application Ser. No. 15/701,381;

zero or more profile panes 278 (e.g., a first profile pane 278-1 and a second profile pane 278-2), each of which provides profile data for the data source (e.g., histograms representing the distributions of data values for data fields in the data source); and a set of context-specific function panes 280, which display information corresponding to specific types of nodes selected from the data flow pane (e.g., the displayed function pane is determined based on the selection of a node). One of the context-specific function panes is the join pane 281, which displays information related to a join node that is selected from the data flow pane, such as information about join clauses and/or join results;

flows 260, each of which provides a detailed execution plan for constructing a data set (or new data source) based on designated input data;

a data aggregator 262 for aggregating data fields in the data source during data preparation;

a histogram generator 264, which generates visual distributions (e.g., statistical distributions) and visual indicators on aggregated data fields in the data source during data preparation;

a widget generator 266, which generates widgets that include user-selectable options. For example, a widget is generated in response to a user selecting a user-selectable affordance, and/or hovering over a visual distribution. In some implementations, the widget includes user-selectable options, such as data fields from the data source, that the user can easily select;

a server interface 268 for connecting the data prep application to a server 300, which includes one or more databases. In some implementations, the server executes flows according to a schedule. For example, a user publishes flows 260 to the server 300 via the server interface 268, including a schedule 352 for when each flow 260 will run (e.g., daily or weekly); and a feature/version matrix 290, which specifies which flow elements are available according to software version. In general, once a flow feature is available in a version, it remains available for all future versions. In this way, it is sufficient to compare the version in which a new flow feature was introduced to the software version on the server in order to know what features are available. This is illustrated in more detail in FIG. 2C.

FIG. 2C illustrates a skeletal feature/version matrix 290, which can be used to determine which data prep flow features are available based on the connected server. If a data flow only runs on a client device, the client device can use whatever data flow elements are provided in the currently installed version of the data prep application. However, in many cases a flow is published to a server, and publishing the flow to the server includes a schedule of when it runs. Because the data prep flow will run on the server, the server only supports the flow elements that it knows about, which may not be identical to the flow elements available on the client device if the server has an older version of the data prep software.

Disclosed implementations enable a server to identify what features it is providing based on its version number. In some implementations, a client device can request the version number from the connected server, and use this version number together with the feature/version matrix to determine which features are available. In some implementations, the client device can request whether a specific feature is available from the server (e.g., asking the server if it supports the feature with feature ID="108"). In some implementations, a client device can request a complete list of the features that are provided by the server, and the server returns the supported list. In some implementations, the testing of available features occurs when a user publishes a flow to the server. The server reviews all of the flow elements in the flow to be published to verify that they are supported. If there are any elements in the flow that are unsupported, the server returns an error message identifying the flow elements that are not supported. Some implementations apply some combination (or all) of these techniques to communicate which flow elements are supported by the server. The simplified model of a feature/version matrix 290 includes a Feature ID field 292, which is a unique identifier of flow features. The Feature/Version matrix 290 also includes a Feature Description 294, which is a description that will be presented to users. In some implementations, the Feature Description is provided in the Flow Palette of the Data Preparation Application associated with each feature icon. In some implementations, the Feature/Version Matrix 290 includes both short descriptions and longer descriptions. In some implementations, longer descriptions are provided in the flow palette as popup descriptions. The Feature/Version Matrix 290 also includes a Minimum Version field 296, which indicates in which version of the software the feature first appeared. Different implementations store the minimum version in various formats, but it is generally required to be monotonically increasing.

FIG. 2C lists a subset of features in the Feature/Version Matrix 290, including the feature "Query Data Source" 298-00, the feature "Inner Join" 298-02, the feature "Duplicate Fields" 298-08, the feature "Keep Only Selected Fields" 298-09, and the feature "Script Steps" 298-10. Some of these features will be referred to later with respect to FIGS. 5A-5C.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Figure 3:
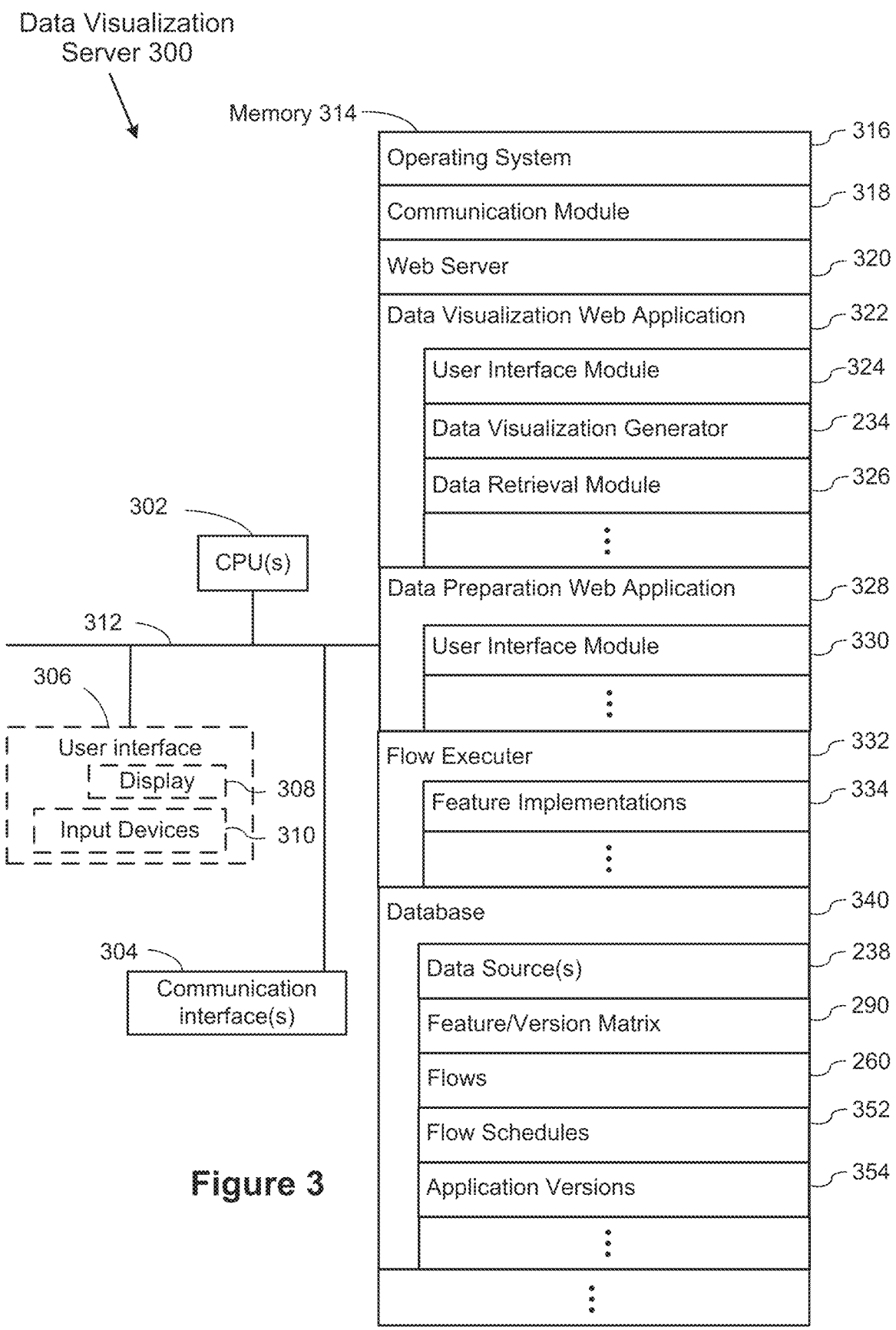
FIG. 3 is a block diagram of a server computing device according to some implementations.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated FIG. 3 is a block diagram of a data visualization server 300 in accordance with some implementations. A data visualization server 300 may host one or more databases 340 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 314 includes one or more storage devices remotely located from the CPU(s) 302. The memory 314, or alternatively the non-volatile memory devices within the memory 314, comprises a non-transitory computer-readable storage medium.

In some implementations, the memory 314, or the computer-readable storage medium of the memory 314, stores the following programs, modules, and data structures, or a subset thereof:
- an operating system 316, which includes procedures for handling various basic system services and for performing hardware dependent tasks;
- a network communication module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a data visualization web application 322, which may be downloaded and executed by a web browser 226 on a user's computing device 200. In general, a data visualization web application 322 has the same functionality as a desktop data visualization application 230, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322;
- a data visualization generation module 234, which generates and displays data visualizations according to user-selected data sources and data fields. The operation of the data visualization generation module is described above with respect to a computing device 200;
- in some implementations, the web application 322 includes a data retrieval module 326, which builds and executes queries to retrieve data from one or more data sources 238. The data sources 238 may be stored locally on the server 300 or stored in an external database. In some implementations, data from two or more data sources may be blended. In some implementations, the data retrieval module 326 uses a visual specification 237 to build the queries, as described above for the computing device 200 in FIG. 2;
- a data preparation web application 328 which may be downloaded and executed by a web browser 226 on a user's computing device 200. In general, a data preparation web application 328 has the same functionality as a desktop data preparation application 250, but provides the flexibility of access from any device at any location with network connectivity, and does not require installation and maintenance. In some implementations, the data preparation web application 328 includes various software modules to perform certain tasks. In some implementations, the web application 328 includes a user interface module 330, which provides the user interface for all aspects of the web application 328;
- a flow executer 332, which executes published flows 260 according to designated flow schedules 352 to generate or regenerate the data output for the flow. The flow executer 332 uses feature implementations 334 to execute the flows. In some implementations, feature implementations 334 are in the main code line for the flow executer, stored as separate objects, or stored as executable binary data. Most of the features are parameterized, so executing a flow feature requires specifying the parameters. For example, the feature "Query Data Source" 298-00 requires an identifier of the data source (e.g., a network path or URL) as well as a query;
- one or more databases 340, which store data used or created by the data visualization web application 322, the data visualization application 230, the data preparation web application 328, the data preparation application 250, the flow executer 332, or other applications running on the server 300. The databases 340 may store data sources 238, which provide the data used in the generated data visualizations or used as input to a data prep flow. Each data source 238 includes one or more data fields. In some implementations, the database 340 stores user preferences;
- the one or more databases 340 store a feature/version matrix 290, as described above with respect to FIGS. 2B and 2C;
- the one or more databases store published flows 260 and associated flow schedules 352. Flow schedules 352 are generally periodic, such as daily or weekly. The frequency of execution typically depends on how frequently the underlying raw data changes and how up-to-date the extract needs to be; and
- the one or more databases 340 store application versions 354, including a version for the flow executer 332. The version for the flow executer determines which of the flow elements are available for flows that will run at the server.

The databases 340 may store data in many different formats, and commonly include many distinct tables, each with a plurality of data fields. Some data sources comprise a single table. The data fields include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields are stored separately from the data source 238. In some implementations, the database 340 stores a set of user preferences for each user. The user preferences may be used when the data visualization web application 322 (or application 230)

makes recommendations about how to view a set of data fields. The databases 340 may be separate from the data visualization server 300, or may be included with the data visualization server (or both).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

Figure 4:
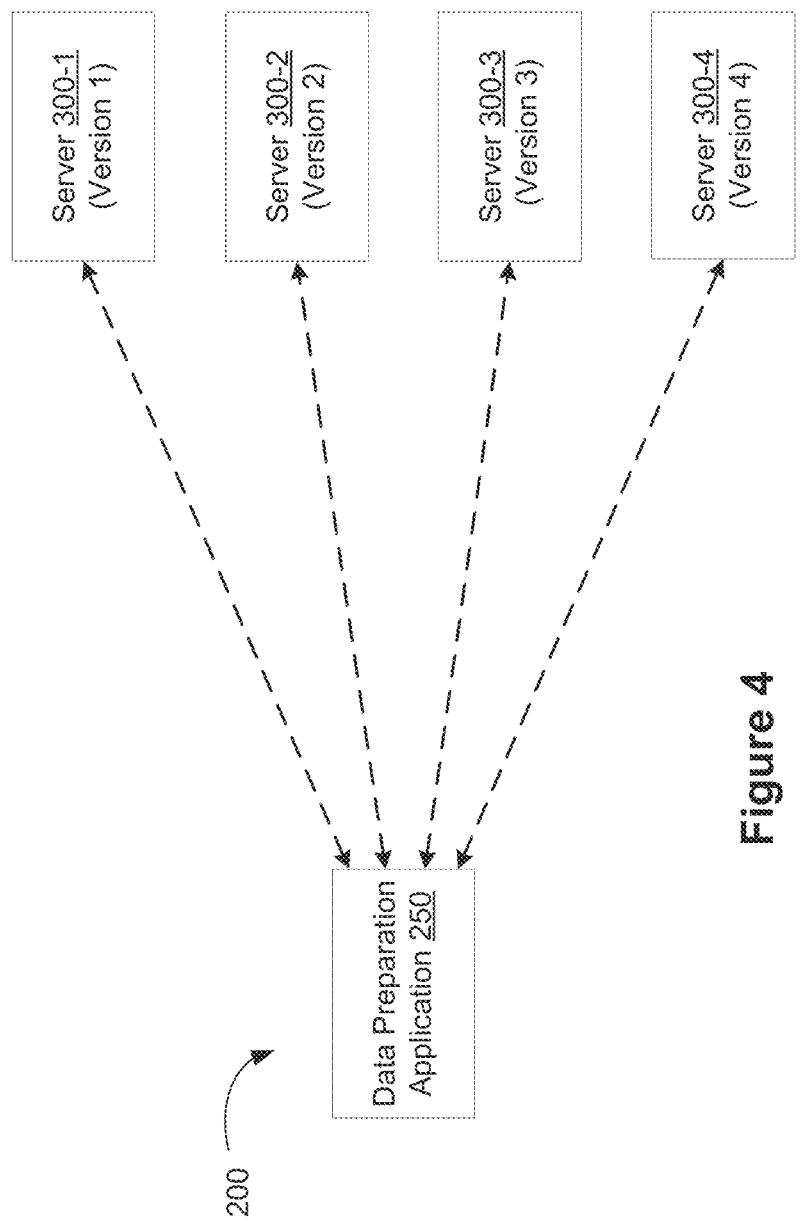
FIG. 4 illustrates a computing device connecting to one or more server computing devices according to some implementations.

FIG. 4 illustrates a computing device 200 connecting to one or more servers 300. In some implementations, the computing device 200 executes a data preparation application 250, where the data preparation application has a first software version. In this example, there are four servers 300-1, 300-2, 300-3, and 3004, each running a different version of the data prep server application. This would be highly unusual in practice, but it is useful as an illustration. In general, if the connected server has a version that is the same as the client device or has a newer version than the client device, there is no issue, because all of the flow elements that are provided by the data prep application 250 are supported by the connected server. However, if the connected server has a version that is older than the version of the data prep application 250 running on the client device, the client device may have some flow elements that are not supported by the connected server. For example, suppose the data prep application 250 on the client device is on Version 3 of the software. In this case, all of the features known to the data prep application 250 are available if the client device is connected to the third server 300-3 or the fourth server 300-4. However, if the client device is connected to the first server 300-1 or the second server 300-2, some of the features (flow elements) may not be supported.

The data prep application 250 publishes and/or schedules flows to run at the server system. In some implementations, a new version of the client application is not supported by an older version of the server system. For example, a flow built in the client application includes one or more input connectors and/or other features that are not supported in the server version in which the flow is published.

In some implementations, the computing device automatically initiates a connection with a server 300 upon opening the data preparation application 250, at the computing device. In some implementations, the computing device 200 connects to one or more servers in response to a user input, at the computing device, requesting to publish the flow. For example, the data preparation application 250 provides a user with features to create flows. In some implementations, the data preparation application 250 includes a plurality of flow elements provided to help a user prepare data and build flows. In some implementations, additional flow elements are added when the data preparation application is updated (e.g., from an earlier version to a later version). In some implementations, the later version of the data preparation application 250 includes one or more features that are not available in the earlier version of the data preparation application. For example, in FIG. 4, the computing device 200 may be executing the latest version of the data preparation application 250 (e.g., version 4).

The server runs a data preparation server application (e.g., the flow executer 332). In some implementations, the application 332 at the server 300 is not updated immediately when a newer version becomes available. For example, the first server 300-1 is running version 1 of the data preparation web application, the second server 300-2 is running version 2 of the data preparation server application, the third server 300-3 is running version 3 of the data preparation server application, and the fourth server 300-4 is running version 4 of the data preparation server application. In some implementations, the versions of the data preparation application 250 for the computing device and the versions for the data preparation server application do not correspond. In some implementations, the data preparation application 250 that executes on the computing device 200 is updated on a different schedule than the data preparation server application. For example, the data preparation application 250 is running the latest version (Version 4) while the data preparation server application is running a different version (e.g., Version 1, 2, or 3). If Version 4 introduced some new data flow elements, then the client device would need to connect to the fourth server 300-4 to be able to publish flows using any of the new flow elements.

In some implementations, features that are available in the latest version of the data preparation application 250 (e.g., Version 4) are not available in older versions of the data preparation server application executing at a server. For example, all of the features available in version 1 of the data preparation application executing at computing device 200 are available from the data prep server application version 1 executing on the first server 300-1. One or more features that were made available in version 2 (i.e., that were not available in version 1) of the data preparation application executing at computing device 200 are not available from the data prep server application version 1 executing on the first server 300-1. In some implementations, the features include one or more widgets, which may include user-selectable options, that are generated by the data preparation application 250. For example, a widget is generated in response to a user selecting a user-selectable affordance, and/or hovering over a visual distribution. In some implementations, the widget includes user-selectable options, such as data fields from the data source, that the user can easily select. In some implementations, one or more of the widgets are not available with the version of the data prep server application executing on the server connected to the computing device generating the widgets.

As an example, suppose the data preparation application 250 is executing the latest version (e.g., version 4) that is available for the computing device 200. When the data preparation application 250 is opened at the computing device 200, the computing device 200 connects to a server (e.g., the first server 300-1). In some implementations, the data preparation application 250 recognizes that the connected server 300-1 is executing an old version of the web application (e.g., version 1). In response to determining that the connected server is running a different version (e.g., not the latest version), the computing device determines that one or more features that are available in version 4 of the data preparation application are not available in version 1 of the data prep server application. The computing device provides an indication to the user that the one or more features are not available. For example, the computing device executing the data preparation application 250 greys out user interface elements (e.g., such that the elements are not selectable) that represent the one or more features. In some implementations, different features and user interface elements corresponding to those features are indicated (e.g., greyed out) based on the version of the server to which the computing device is currently connected.

In some implementations, the computing device maintains a connection with the server that is executing an older version of the data prep server application and provides visual indications, within the local data preparation application, of features that are not available.

In some implementations, the computing device provides a user-selectable option to disconnect from the server executing an older version. For example, the user is alerted that particular features are unavailable based on the currently connected server, and the user can select to disconnect from the server and re-connect the application to a different server, if available. For example, the application re-connects to a server that is executing a more recent version of the web application so that more features at the computing device are available to (e.g., compatible with) the user.

In some implementations, the computing device provides the user-selectable option in response to receiving a user input selecting a feature that is not compatible with the connected server (e.g., the data prep server application executing on the connected server). For example, the user attempts to select a greyed-out user interface element (e.g., that corresponds to a feature that is not compatible with the connected server). In response to the user selection, an option is provided to the user to disconnect from the server and re-connect to another server.

In some implementations, in response to determining that the connected server is executing a different version of the data prep server application, the computing device automatically disconnects from the server and initiates a connection with a different server. For example, the computing device initiates a connection with the fourth server 300-4, which is executing Version 4 of the data prep server application. In some implementations, when the server and the computing device are both executing the latest version of the data preparation application, the computing device maintains the connection with the server.

For example, in some implementations, in response to determining that the connected server is executing version 1 of the web application, the computing device disconnects from the first server 300-1 and initiates a connection with the second server 300-2. In some implementations, the computing device determines that the second server 300-2 is executing version 2 of the data prep server application. In some implementations, the computing device determines a set of features that are available in the data preparation application version (e.g., version 4) that are not compatible with data prep server application version 2. In some implementations, the set of features that are not compatible between version 4 of the local application and version 2 of the server application is a different set of features than the features that are not compatible between version 4 of the local application and version 1 of the server application. For example, some features that are not compatible between version 4 of the local application and version 1 of the server application are compatible between version 4 of the local application and version 2 of the server application. For example, as the server application is updated, a portion of the features that were not compatible in the previous version of the web application are now available.

In some implementations, alerts are provided before the user attempts to publish a flow to the server. For example, the computing device provides alerts to the user dynamically as the user selects features (e.g., in the application) that are incompatible with a currently connected server. In some implementations, the computing device does not provide the alerts in response to a user input to publish the flow (e.g., the alerts are provided before the user goes to publish).

FIGS. 5A-5D illustrate examples of warnings that appear when a server that is connected to the computing device does not support all of the features available in the application executing at the computing device. For example, the data preparation application 250 includes an alerts affordance 501 on the graphical user interface. The alerts affordance 501, when executed, displays warnings of various features that the user has selected while building a flow in the data preparation application. In some implementations, the warnings include a description of the features that are not compatible in the current flow. In this example, the three problems are for the features 298-08, 298-09, and 298-10 (see FIG. 2C). In some implementations, the computing device does not allow a user to access the features (e.g., does not provide warnings to the user because no incompatible features could be selected). For example, the user is unable to select the features identified as being incompatible. In some implementations, the alert further provides information to indicate the step, annotation, column and/or change in which the warning is associated.

Figure 5A:
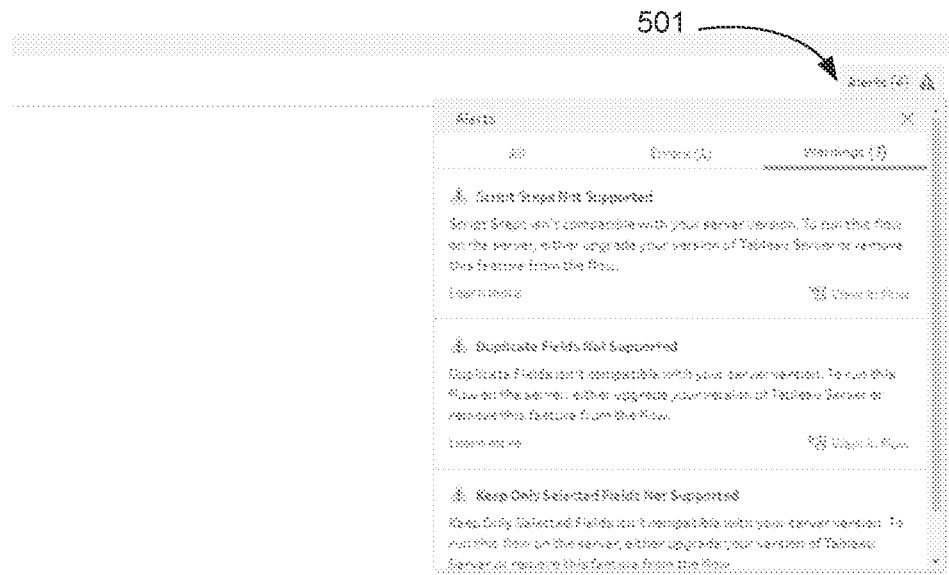
FIGS. 5A-5D provide a series of screen shots for a graphical user interface according to some implementations.
Figure 5B:
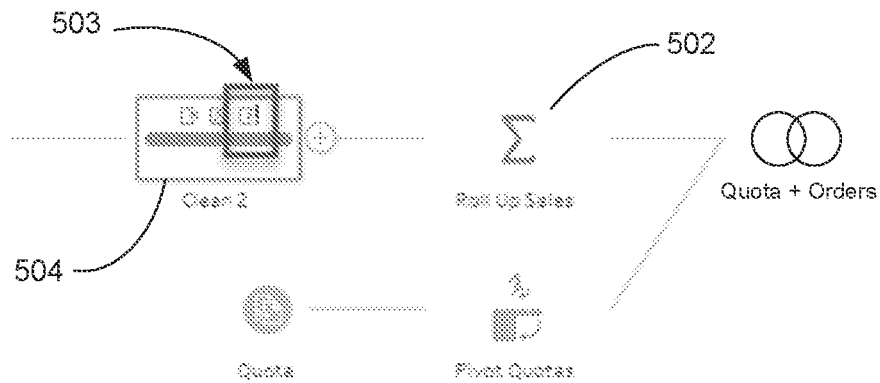

FIG. 5B illustrates a portion of a flow pane. The flow pane displays annotations and other steps to manipulate data. For example, the flow pane includes a "Roll up" step 502. "Roll up" is an example of a step in a flow designed by a user to aggregate data. In some implementations, additional computations are available for a user to add into a flow in order to manipulate the data. For example, a user may access and combine data from a plurality of data sources. The flow illustrates how data preparation is analyzed into a data visualization.

In some implementations, the data preparation application allows a user to combine, shape, and clean data to prepare the data for analytics. In some implementations, a plurality of views are provided to allow a user to access row-level data, profiles of columns, and the overall data preparation process (e.g., flow view). In some implementations, an alert indicating an incompatibility warning is included. For example, the exclamation mark shown in the notation 503 indicates that there is a problem with the "Clean 2" step 504 in the flow pane.

In some implementations, the alert indicates all of the incompatibility warnings. For example, if the user fixes all of the alerts, the flow will be compatible with the server version. In some implementations, the flow cannot be published to the server until all of the incompatibility warnings have been fixed.

Figure 5C:
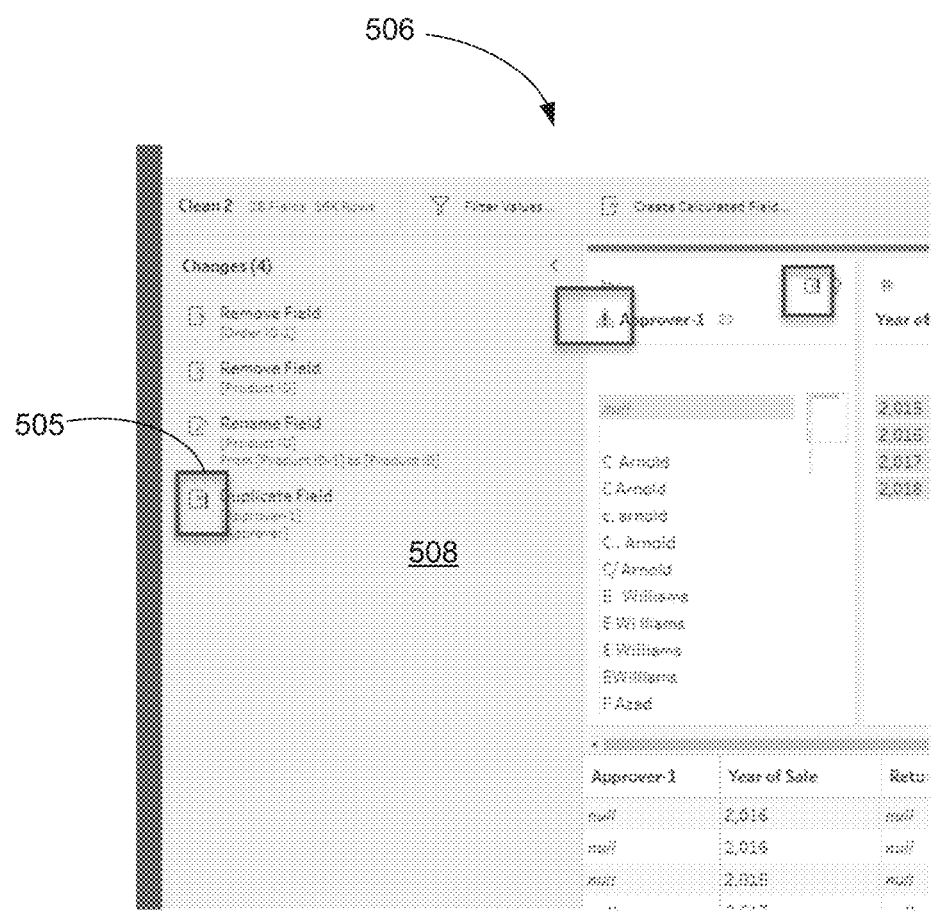

When a user opens the Clean 2 step 504, the user interface displays a content pane 506, as shown in FIG. 5C. In the content pane 506, the annotations, columns, and changes that have warnings are indicated. For example, the change pane 508 shows the individual operations of the Clean 2 node 504 and shows that the "Duplicate Field" operation 505 has a problem.

In some implementations, the user is unable to select and/or make changes that would cause an error. For example, instead of labeling the portion of the flow that has an incompatibility warning, the user is unable to add the step to the flow. For example, the user would be unable to create a flow that would cause an incompatibility warning. In some implementations, the features that are available to a user to create and edit flows are dependent on the server that is connected to the computing device (e.g., based on the version of the data prep server application on the connected server).

Figure 5D:
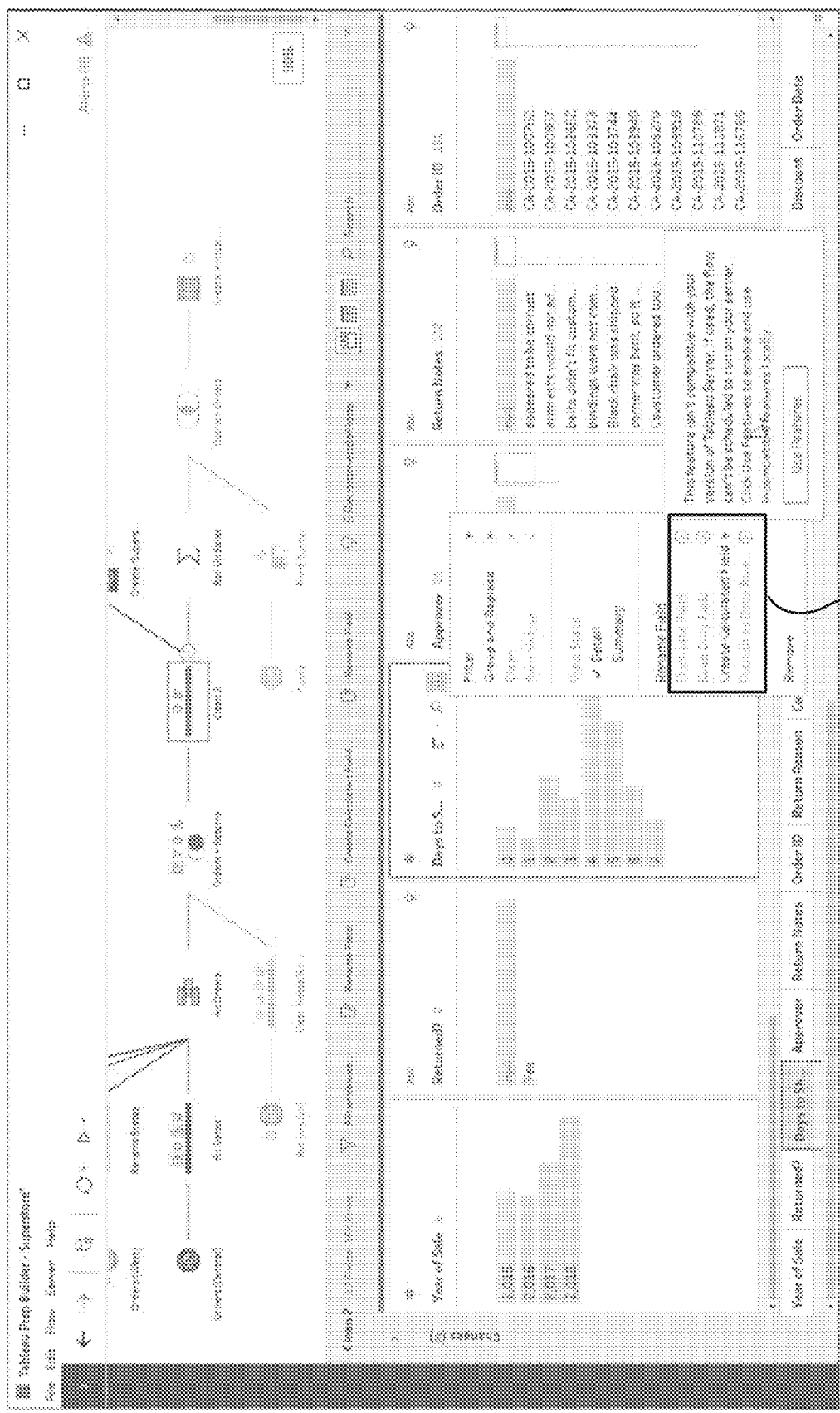
Figure 6A:
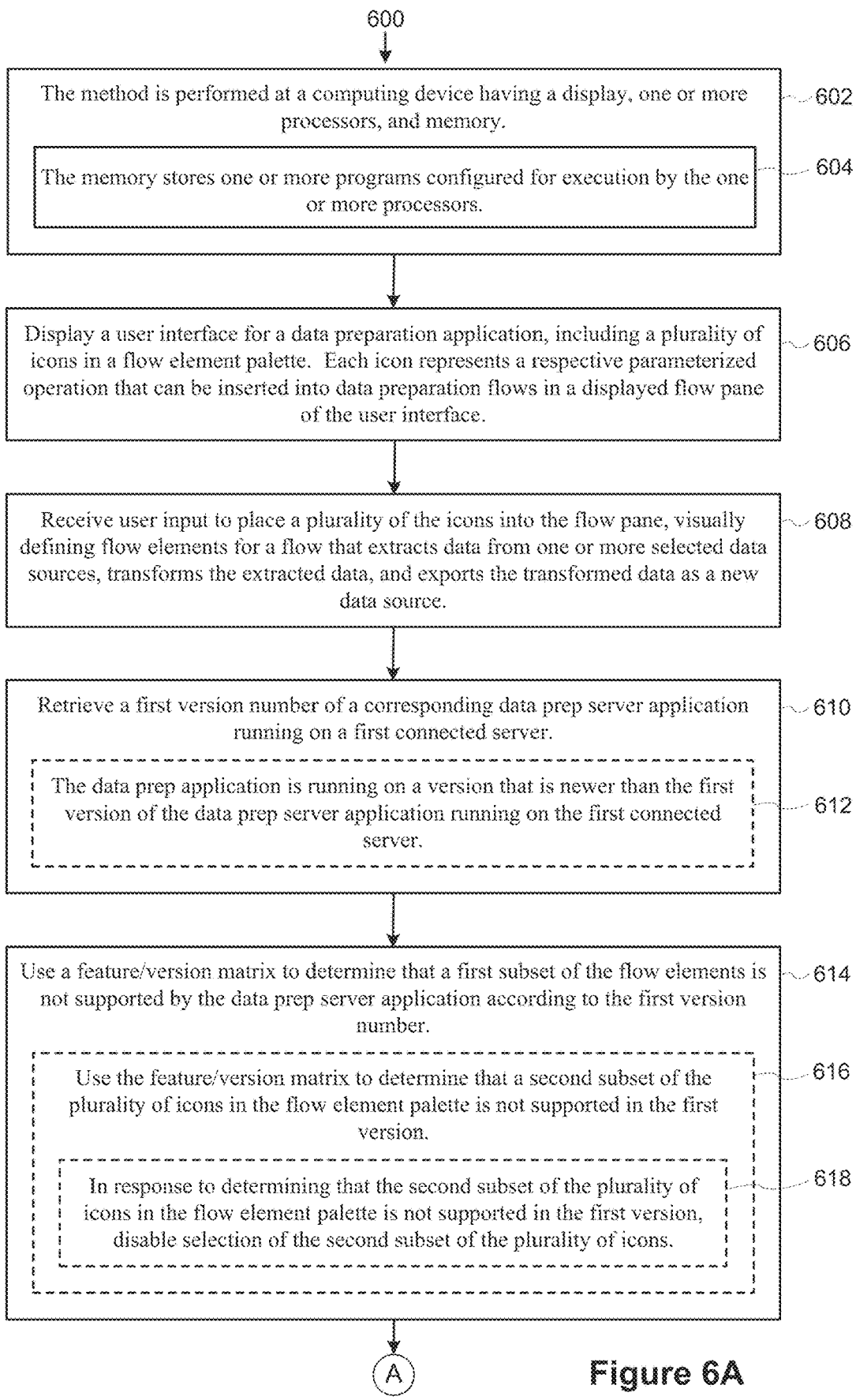
FIGS. 6A-6E provide a flowchart of a method 600 for building data prep flows using flow elements that are available based on server compatibility according to some implementations.
Figure 6B:
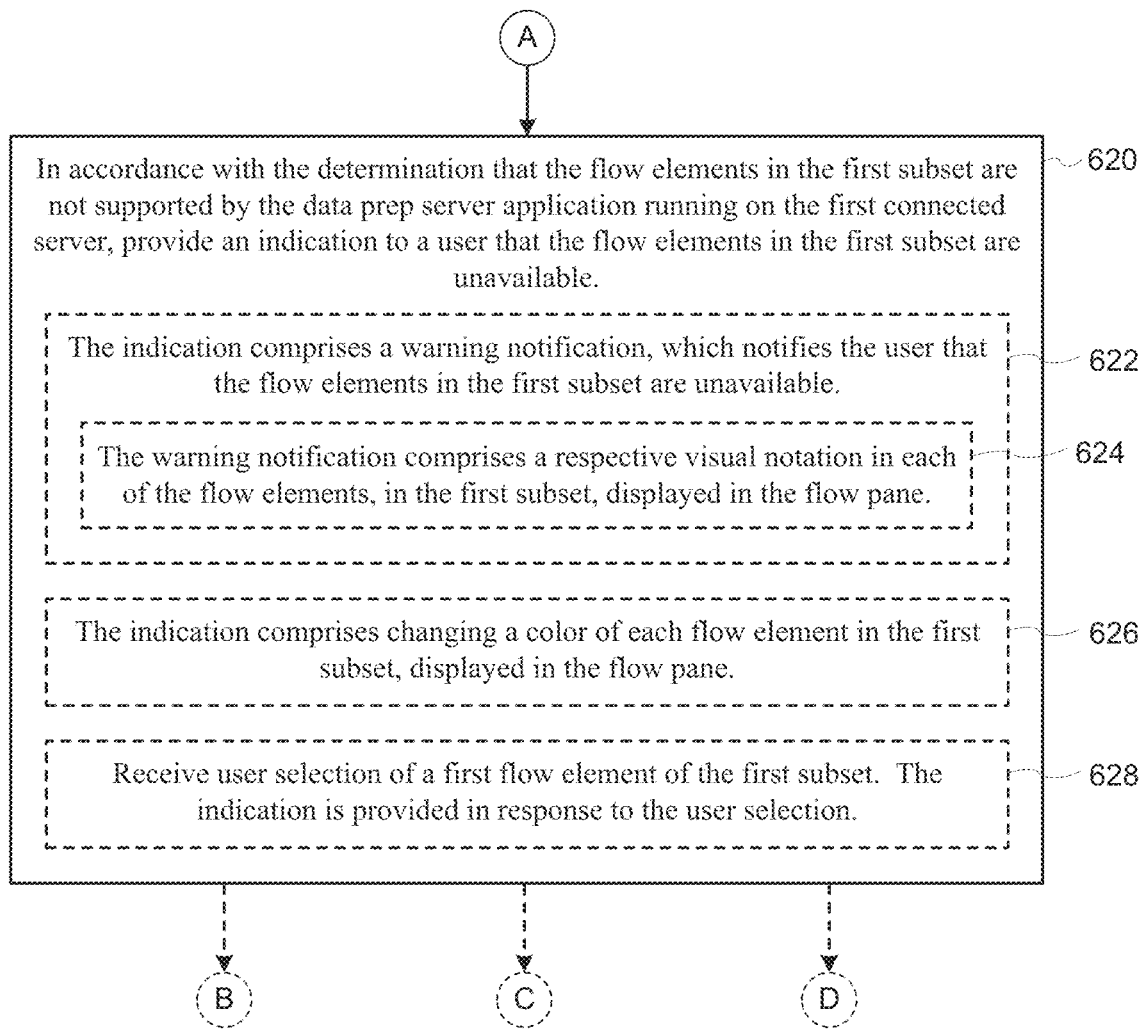
Figure 6C:
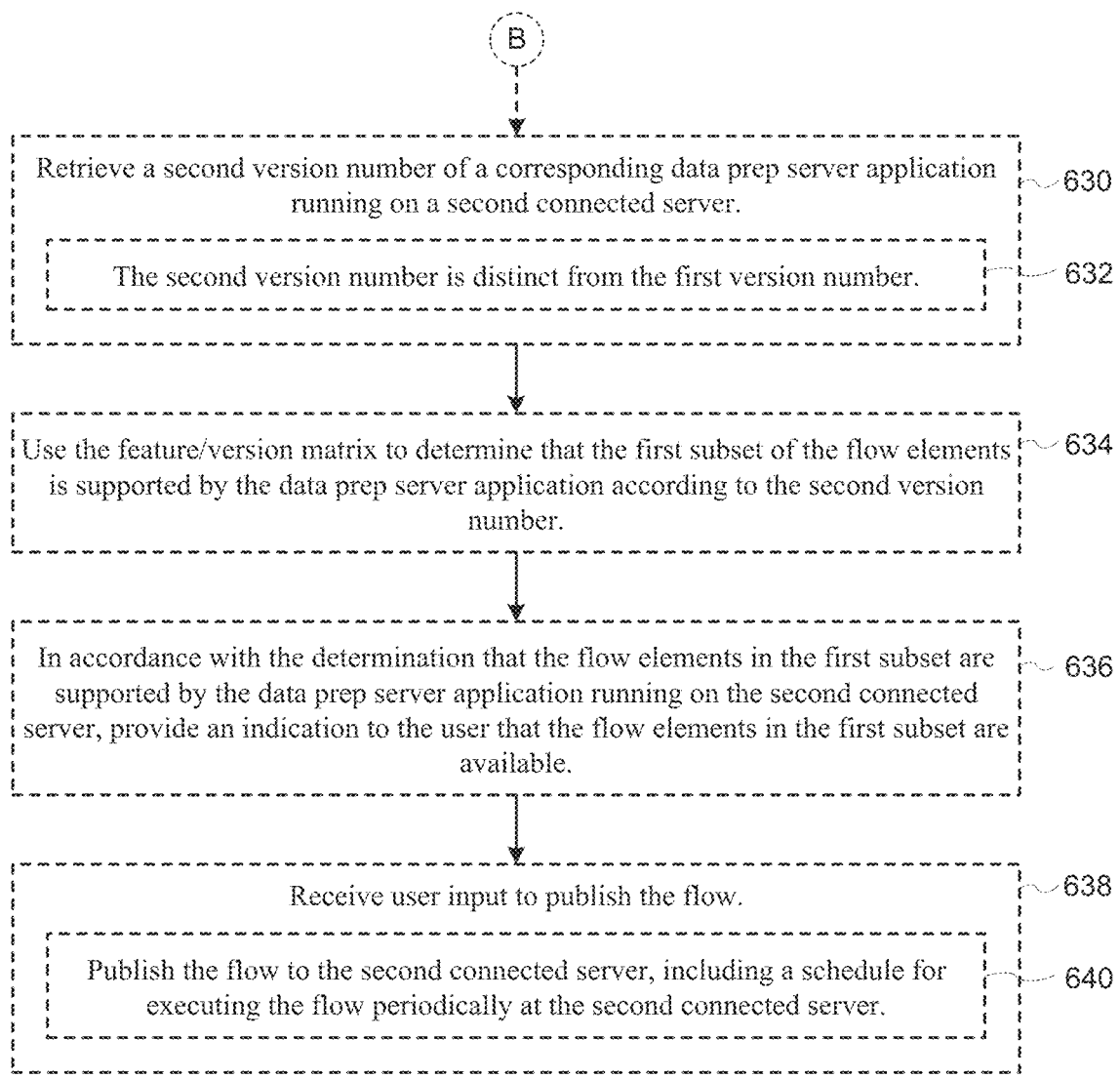
Figure 6D:
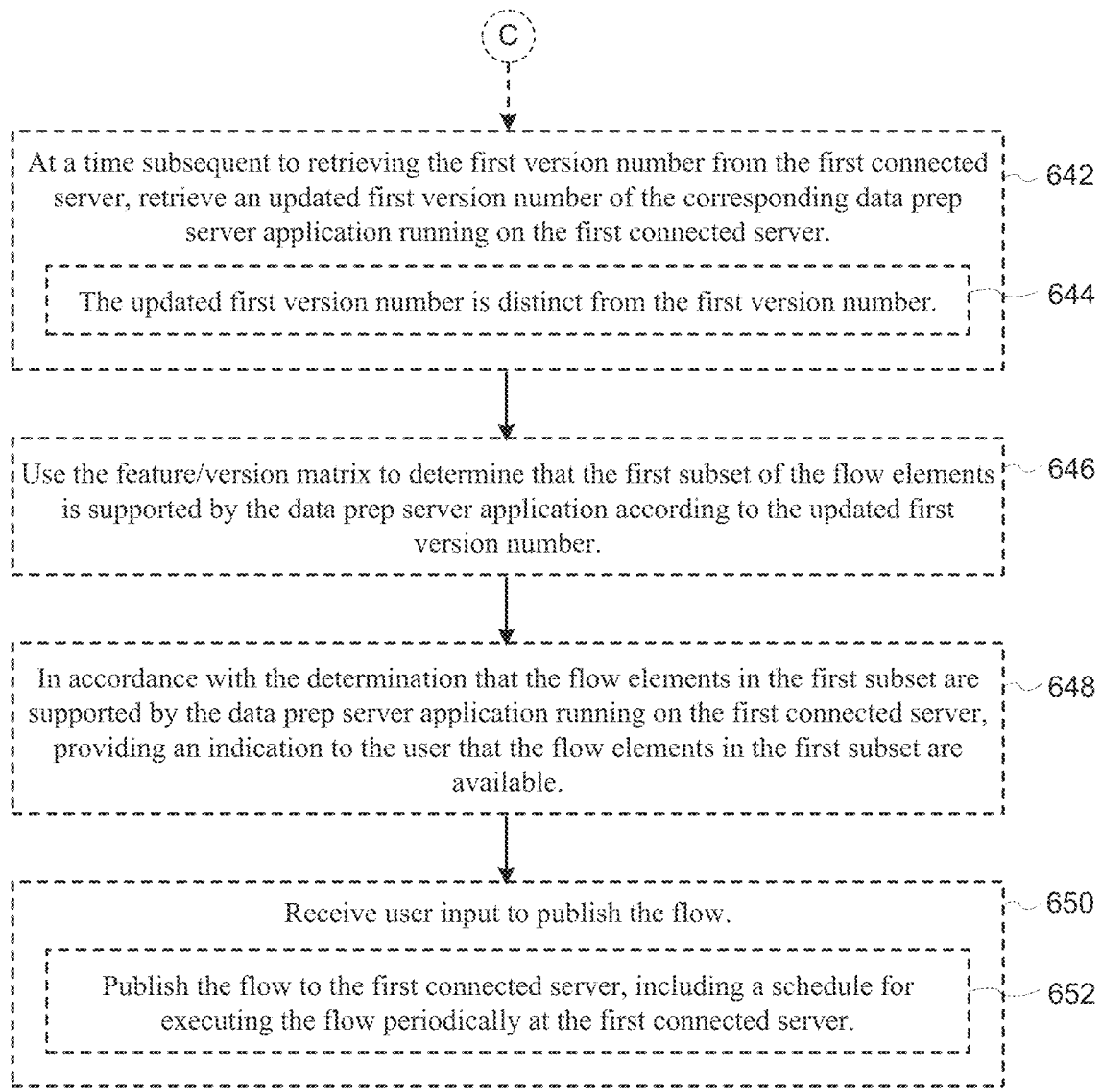
Figure 6E:
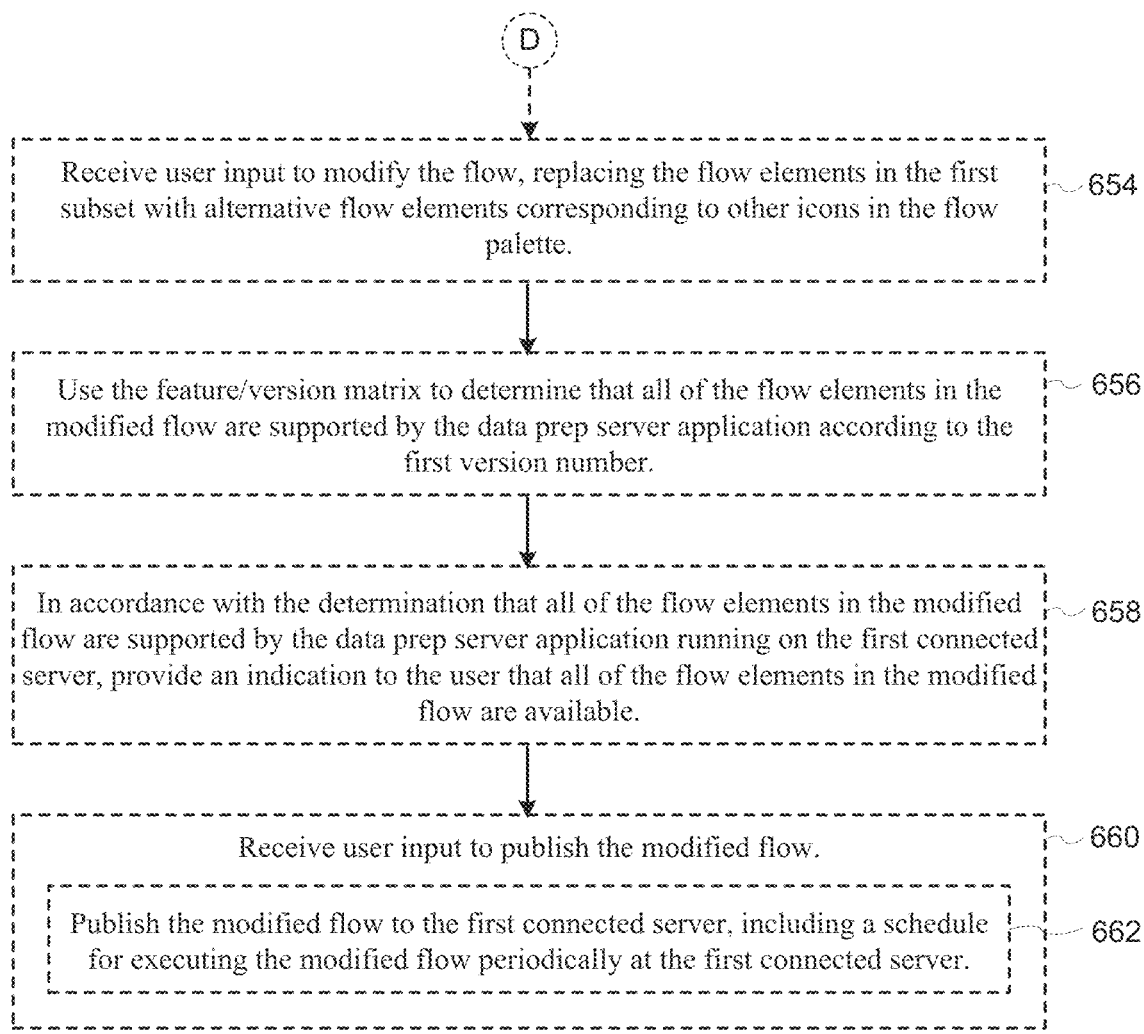

For example, as illustrated in FIG. 5D, features that are not compatible with the current version are greyed out. For example, box 510 indicates a plurality of features (e.g., "Duplicate Field" "Keep Only Field" "Create Calculated Field" and "Publish as Data Role . . . "). In some embodiments, one or more features are greyed out (e.g., "Duplicate Field" "Keep Only Field" and "Publish as Data Role . . . " are displayed in a lighter shade) in accordance with a determination that the one or more features are not compatible with the current version. In some embodiments, one or more other features are not greyed out (e.g., "Create Calculated Field") indicate that the other features are compatible (and therefore selectable) for use by the user.

FIGS. 6A-6E illustrate a method 600 for building data preparation flows. The method is performed at a computing device (602) having a display, one or more processors, and memory storing (604) one or more programs configured for execution by the one or more processors.

The device displays (606) a user interface for a data preparation application 250 (as illustrated in FIG. 1B), including a plurality of icons in a flow element palette. Each icon represents (606) a respective parameterized operation that can be inserted into data preparation flows in a displayed flow pane of the user interface. For example, the flow 173 in FIG. 1B includes flow elements to retrieve data, join data, and publish the finalized data. A subset of the parameterized operations are shown in FIG. 2C.

The device receives (608) user input to place a plurality of the icons into the flow pane, visually defining flow elements for a flow that extracts data from one or more selected data sources, transforms the extracted data, and exports the transformed data as a new data source, as illustrated in FIG. 1B.

The device retrieves (610) a first version number of a corresponding data prep server application (e.g., the flow executer 332 in FIG. 3) running on a first connected server. In some instances, the data prep application 250 is running (612) on a version that is newer than the first version of the data prep server application running on the first connected server. When the version is newer, there may be flow elements available in the data prep application 250 that are not supported by the connected server.

The device uses a feature/version matrix 290 to determine (614) that a first subset of the flow elements is not supported by the data prep server application according to the first version number. See, e.g., FIG. 5A, illustrating three flow elements that are not supported by the server. In some implementations, the device uses the feature/version matrix 290 to determine (616) that a second subset of the plurality of icons in the flow element palette is not supported in the first version. In response to determining that the second subset of the plurality of icons in the flow element palette is not supported in the first version, the device disables (618) selection of the second subset of the plurality of icons. In some implementations, disabling selection entails dimming the icons corresponding to flow elements that are not available at the connected server. In this way, users are aware of the flow elements, and recognize that they are not available because of the connected server. Some implementations disable selecting certain elements by not displaying them.

In accordance with the determination that the flow elements in the first subset are not supported by the data prep server application running on the first connected server, the device provides (620) an indication to a user that the flow elements in the first subset are unavailable. This is illustrated in FIGS. 5A-5C. In some implementations, the indication comprises (622) a warning notification, which notifies the user that the flow elements in the first subset are unavailable. In some implementations, the warning notification comprises (624) a respective visual notation in each of the flow elements, in the first subset, displayed in the flow pane. This is illustrated by the notation 503 in FIG. 5B and the notation 505 in FIG. 5C. In some implementations, the indication comprises (626) changing the color of each flow element in the first subset, displayed in the flow pane. For example, problematic data flow elements may be displayed in a shade of red. In some implementations, the applied color affects only a portion of each icon (e.g., enough to be visible, but not the entire flow element). In some instances, a user selects (628) a first flow element of the first subset. The device provides (628) the indication in response to the user selection. In some implementations, the warning notifications are generated in response to a user using an incompatible feature within the application (e.g., the flow elements in the first subset are unavailable). For example, in some implementations, connecting to the server will not generate the warning until the user defines (e.g., selects) a flow element that is incompatible.

When one or more flow elements in a flow are not available at the currently connected server, there are several ways to proceed (instead of throwing away already completed work). In some cases, a corporate enterprise has more than one server, and the desired flow elements are available from one of the other servers. In some implementations, the data prep application automatically connects to one of these other servers. In other implementations, a user has to select connecting to one of the other servers. In some instances, the server that is missing the desired flow elements will be upgraded shortly, so a user can save his or her work locally and reconnect to the server later (e.g., the next day or after a weekend in which server upgrades are performed). If there are no alterative servers and the one server is not likely to be upgraded soon, a user can modify the flow to use alternative data elements that are supported. Typically there are multiple ways to achieve the same flow process, so the user can avoid the unsupported flow elements.

In some implementations, the device retrieves (630) a second version number of a corresponding data prep server application running on a second connected server. In some instances, the second version number is (632) distinct from the first version number.

When the second version number is newer than the first version number, the device uses (634) the feature/version matrix 290 to determine (634) that the first subset of the flow elements is supported by the data prep server application according to the second version number. In accordance with the determination that the flow elements in the first subset are supported by the data prep server application running on the second connected server, the device provides (636) an indication to the user that the flow elements in the first subset are available. In some implementations, the indication is the absence of warnings that were previously displayed. In some implementations, the indication entails a positive indicator, such as showing the new flow elements in green.

The device then receives (638) user input to publish the flow. In response to the user input, the device publishes (640) the flow to the second connected server, including a schedule for executing the flow periodically at the second connected server.

In some implementations, at a time subsequent to retrieving the first version number from the first connected server, the device retrieves (642) an updated first version number of the corresponding data prep server application running on the first connected server. (The first connected server may have been upgraded.) In some instances, the updated first version number is (644) distinct from the first version number.

When the updated version number is newer than the first version number, the device uses (646) the feature/version matrix 290 to determine (646) that the first subset of the flow elements is supported by the data prep server application according to the updated first version number. In accordance with the determination that the flow elements in the first subset are supported by the data prep server application running on the first connected server, the device provides (648) an indication to the user that the flow elements in the first subset are available.

The device then receives (650) user input to publish the flow. In response to the user input, the device publishes (652) the flow to the first connected server, including a schedule for executing the flow periodically at the first connected server.

In some implementations, the user provides (654) input to modify the flow, replacing the flow elements in the first subset with alternative flow elements corresponding to other icons in the flow palette. The device uses (656) the feature/version matrix 290 to determine (656) that all of the flow elements in the modified flow are supported by the data prep server application according to the first version number. In accordance with the determination that all of the flow elements in the modified flow are supported by the data prep server application running on the first connected server, the device provides (658) an indication to the user that all of the flow elements in the modified flow are available (e.g., remove the warning messages presented earlier.)

The device then receives (660) user input to publish the modified flow. In response to the user input, the device publishes (652) the modified flow to the first connected server, including a schedule for executing the modified flow periodically at the first connected server.

Although the techniques described have been applied to a data prep application, the same techniques can be applied to other client applications that rely on a corresponding server application. As the software continues to evolve, a database tracks when new features are introduced, and makes the features available in the client application according to the software version running on the server. These techniques can also be applied in the context of a peer-to-peer application where the two peers identify their versions and use only features that are supported by both peers.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for building data preparation flows, comprising:
    at a computing device having a display, one or more processors, and memory storing one or more programs configured for execution by the one or more processors:
        displaying a user interface for a data preparation application, including:
            a flow pane that visually represents a data preparation flow; and
            a plurality of icons in a flow element palette, each icon representing a respective parameterized operation that can be inserted into the data preparation flow;
        receiving user input to place one or more icons of the plurality of icons into the flow pane, wherein the one or more icons placed into the flow pane visually define one or more flow elements for the data preparation flow;
        after receiving the user input to place the one or more icons into the flow pane, connecting to a data preparation server application running on a first connected server;
        retrieving a first version number of the data preparation server application running on the first connected server;
        using a feature/version matrix:
            determining that a first subset of parameterized operations represented by a first subset of the one or more icons placed into the flow pane is not supported by the data preparation server application according to the first version number; and
            determining that a second subset of parameterized operations represented by a second subset of the one or more icons placed into the flow pane is supported by the data preparation server application;

providing, for each of the icons in the first subset, a first indication that the respective parameterized operation represented by the respective icon in the first subset is unavailable to be published in the data preparation flow;

receiving additional user input to modify the data preparation flow, including replacing the icons in the first subset with icons of the plurality of icons in the flow element palette that are supported by the data preparation server application; and publishing the modified data preparation flow to the first connected server, including a schedule for executing the modified data preparation flow periodically at the first connected server.

2. The method of claim 1, wherein the data preparation server application executes each of the one or more flow elements for the data preparation flow after publication, to extract data from one or more selected data sources, transform the extracted data, and export the transformed data as a new data source.

3. The method of claim 1, wherein the first indication comprises a warning notification.

4. The method of claim 1, wherein the first indication comprises a respective visual notation in each of the icons in the first subset, displayed in the flow pane.

5. The method of claim 1, wherein the first indication comprises changing a color of each icon in the first subset, displayed in the flow pane.

6. The method of claim 1, further comprising:
determining that one or more icons of the plurality of icons in the flow element palette are not supported by the data preparation server application; and
providing, for each of the one or more icons of the plurality of icons in the flow element palette, a visual indication indicating that the respective parameterized operation represented by the respective icon is not available to be inserted into the data preparation flow.

7. The method of claim 1, further comprising, receiving user selection of a first icon of the first subset, wherein the first indication is provided in response to the user selection.

8. The method of claim 1, further comprising:
in response to determining that the first subset of parameterized operations in the flow pane is not supported in a version of the data preparation server application corresponding to the first version number, disabling selection of the first subset of the plurality of icons.

9. The method of claim 1, further comprising:
at a time subsequent to retrieving the first version number from the first connected server, retrieving an updated first version number of the corresponding data preparation server application running on the first connected server, wherein the updated first version number is distinct from the first version number;
using the feature/version matrix, determining that the first subset of parameterized operations is supported by the data preparation server application according to the updated first version number;
in accordance with the determination that the flow elements in the first subset are supported by the data preparation server application running on the first connected server, providing a second indication that the parameterized operations represented by the icons in the first subset are available; and
in accordance with a second additional received user input, publishing the data preparation flow to the first connected server, including a second schedule for executing the flow periodically at the first connected server.

10. A computing device comprising:
one or more processors;
memory coupled to the one or more processors;
a display; and
one or more programs stored in the memory and configured for execution by the one or more processors, the one or more programs comprising instructions for:
displaying a user interface for a data preparation application, including:
a flow pane that visually represents a data preparation flow; and
a plurality of icons in a flow element palette, each icon representing a respective parameterized operation that can be inserted into the data preparation flow;
receiving user input to place one or more icons of the plurality of icons into the flow pane, wherein the one or more icons placed into the flow pane visually define one or more flow elements for the data preparation flow;
after receiving the user input to place the one or more icons into the flow pane, connecting to a data preparation server application running on a first connected server;
retrieving a first version number of the data preparation server application running on the first connected server;
using a feature/version matrix:
determining that a first subset of parameterized operations represented by a first subset of the one or more icons placed into the flow pane is not supported by the data preparation server application according to the first version number; and
determining that a second subset of parameterized operations represented by a second subset of the one or more icons placed into the flow pane is supported by the data preparation server application;
providing, for each of the icons in the first subset, a first indication that the respective parameterized operation represented by the respective icon in the first subset is unavailable to be published in the data preparation flow;
receiving additional user input to modify the data preparation flow, including replacing the icons in the first subset with icons of the plurality of icons in the flow element palette that are supported by the data preparation server application; and
publishing the modified data preparation flow to the first connected server, including a schedule for executing the modified data preparation flow periodically at the first connected server.

11. The computing device of claim 10, wherein the data preparation server application executes each of the one or more flow elements for the data preparation flow after publication, to extract data from one or more selected data sources, transform the extracted data, and export the transformed data as a new data source.

12. The computing device of claim 10, wherein the first indication comprises a warning notification.

13. The computing device of claim 10, wherein the one or more programs further comprise instructions for:

in response to determining that the first subset of parameterized operations in the flow pane is not supported in a version of the data preparation server application corresponding to the first version number, disabling selection of the first subset of the plurality of icons.

14. The computing device of claim 10, wherein the one or more programs further comprise instructions for:
at a time subsequent to retrieving the first version number from the first connected server, retrieving an updated first version number of the corresponding data preparation server application running on the first connected server, wherein the updated first version number is distinct from the first version number;
using the feature/version matrix, determining that the first subset of parameterized operations is supported by the data preparation server application according to the updated first version number;
in accordance with the determination that the flow elements in the first subset are supported by the data preparation server application running on the first connected server, providing a second indication that the parameterized operations represented by the icons in the first subset are available; and
in accordance with a second additional received user input, publishing the data preparation flow to the first connected server, including a second schedule for executing the flow periodically at the first connected server.

15. The computing device of claim 10, wherein the first indication comprises a respective visual notation in each of the icons in the first subset, displayed in the flow element palette.

16. A non-transitory computer readable storage medium storing one or more programs, the one or more programs configured for execution by a computing device having one or more processors, memory, and a display, the one or more programs comprising instructions for:
displaying a user interface for a data preparation application, including:
a flow pane that visually represents a data preparation flow; and
a plurality of icons in a flow element palette, each icon representing a respective parameterized operation that can be inserted into the data preparation flow;
receiving user input to place one or more icons of the plurality of icons into the flow pane, wherein the one or more icons placed into the flow pane visually define one or more flow elements for the data preparation flow;
after receiving the user input to place the one or more icons into the flow pane, connecting to a data preparation server application running on a first connected server;
retrieving a first version number of the data preparation server application running on the first connected server;
using a feature/version matrix:
determining that a first subset of parameterized operations represented by a first subset of the one or more icons placed into the flow pane is not supported by the data preparation server application according to the first version number; and
determining that a second subset of parameterized operations represented by a second subset of the one or more icons placed into the flow pane is supported by the data preparation server application;
providing, for each of the icons in the first subset, a first indication that the respective parameterized operation represented by the respective icon in the first subset is unavailable to be published in the data preparation flow;
receiving additional user input to modify the data preparation flow, including replacing the icons in the first subset with icons of the plurality of icons in the flow element palette that are supported by the data preparation server application; and
publishing the modified data preparation flow to the first connected server, including a schedule for executing the modified data preparation flow periodically at the first connected server.

17. The non-transitory computer readable storage medium of claim 16, wherein the first indication comprises a respective visual notation in each of the icons in the first subset, displayed in the flow pane.

18. The non-transitory computer readable storage medium of claim 16, wherein the first indication comprises changing a color of each icon in the first subset, displayed in the flow pane.

19. The non-transitory computer readable storage medium of claim 16, wherein the one or more programs further comprise instructions for:
determining that one or more icons of the plurality of icons in the flow element palette are not supported by the data preparation server application; and
providing, for each of the one or more icons of the plurality of icons in the flow element palette, a visual indication indicating that the respective parameterized operation represented by the respective icon is not available to be inserted into the data preparation flow.

20. The non-transitory computer readable storage medium of claim 16, wherein the one or more programs further comprise instructions for:
at a time subsequent to retrieving the first version number from the first connected server, retrieving an updated first version number of the corresponding data preparation server application running on the first connected server, wherein the updated first version number is distinct from the first version number;
using the feature/version matrix, determining that the first subset of parameterized operations is supported by the data preparation server application according to the updated first version number;
in accordance with the determination that the flow elements in the first subset are supported by the data preparation server application running on the first connected server, providing a second indication that the parameterized operations represented by the icons in the first subset are available; and
in accordance with a second additional received user input, publishing the data preparation flow to the first connected server, including a second schedule for executing the flow periodically at the first connected server.

* * * * *